(12) United States Patent
Slobodyanyuk et al.

(10) Patent No.: US 12,460,940 B2
(45) Date of Patent: Nov. 4, 2025

(54) MACHINE LEARNING BASED OCCUPANCY GRID GENERATION

(71) Applicant: QUALCOMM Incorporated, San Diego, CA (US)

(72) Inventors: Volodimir Slobodyanyuk, San Diego, CA (US); Radhika Dilip Gowaikar, San Diego, CA (US); Makesh Pravin John Wilson, San Diego, CA (US); Shantanu Chaisson Sanyal, San Diego, CA (US); Avdhut Joshi, San Marcos, CA (US); Christopher Brunner, San Diego, CA (US); Behnaz Rezaei, San Diego, CA (US); Amin Ansari, Federal Way, WA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 18/067,798

(22) Filed: Dec. 19, 2022

(65) Prior Publication Data

US 2024/0200969 A1   Jun. 20, 2024

(51) Int. Cl.
*G01C 21/00* (2006.01)
*G05B 13/02* (2006.01)
*G08B 1/00* (2006.01)
*G08G 1/01* (2006.01)

(52) U.S. Cl.
CPC ..... *G01C 21/3807* (2020.08); *G01C 21/3841* (2020.08); *G05B 13/027* (2013.01); *G08G 1/0104* (2013.01)

(58) Field of Classification Search
None
See application file for complete search history.

(56) References Cited

U.S. PATENT DOCUMENTS

2021/0063200 A1\* 3/2021 Kroepfl .............. G01C 21/3867

OTHER PUBLICATIONS

Elhassan, M., et al., "DSANet: Dilated Spatial Attention for Real-time Semantic Segmentation in Urban Street Scenes", Expert Systems with Applications, Elsevier, Amsterdam, NL, vol. 183, Apr. 29, 2021, XP086757910, pp. 1-12, (Year: 2021).\*

(Continued)

*Primary Examiner* — Adam D Tissot
(74) *Attorney, Agent, or Firm* — QUALCOMM Incorporated

(57) ABSTRACT

In some aspects, a device may receive sensor data associated with a vehicle and a set of frames. The device may aggregate, using a first pose, the sensor data associated with the set of frames to generate an aggregated frame, wherein the aggregated frame is associated with a set of cells. The device may obtain an indication of a respective occupancy label for each cell from the set of cells, wherein the respective occupancy label includes a first occupancy label or a second occupancy label, and wherein a subset of cells from the set of cells are associated with the first occupancy label. The device may train, using data associated with the aggregated frame, a machine learning model to generate an occupancy grid, based on a loss function that only calculates a loss for respective cells from the subset of cells. Numerous other aspects are described.

30 Claims, 7 Drawing Sheets

(56) References Cited

OTHER PUBLICATIONS

Fei, J., et al., "PillarSegNet: Pillar-based Semantic Grid Map Estimation using Sparse LIDAR Data", arXiv:2105.04169v2, 2021 IEEE Intelligent Vehicles Symposium(IV), Jul. 11, 2021, 7 Pages, XP034006057. (Year: 2021).*
Elhassan M.A.M., et al., "DSANet: Dilated Spatial Attention for Real-time Semantic Segmentation in Urban Street Scenes", Expert Systems with Applications, Elsevier, Amsterdam, NL, vol. 183, Apr. 29, 2021, XP086757910, pp. 1-12, Sections 1-4, figures 1, 2, 4, 6.
Fei J., et al., "PillarSegNet: Pillar-based Semantic Grid Map Estimation using Sparse LiDAR Data", arXiv:2105.04169v2, 2021 IEEE Intelligent Vehicles Symposium (IV), Jul. 11, 2021, 7 Pages, XP034006057, Sections III and IV, Figures 1,2.
International Search Report and Written Opinion—PCT/US2023/036527—ISA/EPO—Jan. 25, 2024.

\* cited by examiner

MACHINE LEARNING BASED OCCUPANCY GRID GENERATION

FIELD OF THE DISCLOSURE

Aspects of the present disclosure generally relate to occupancy grid generation and, for example, to machine learning-based occupancy grid generation.

BACKGROUND

Occupancy grid mapping may be used in road scene understanding for autonomous driving. Occupancy grid mapping may encapsulate information of the drivable area and road obstacles of an environment being traveled by an autonomous vehicle.

SUMMARY

Some aspects described herein relate to a device. The device may include one or more memories and one or more processors coupled to the one or more memories. The one or more processors may be configured to receive sensor data associated with a vehicle and a set of frames, wherein the sensor data indicates one or more sensor detections. The one or more processors may be configured to aggregate, using a first pose, the one or more sensor detections into an aggregated frame, wherein the aggregated frame is associated with a set of cells. The one or more processors may be configured to obtain an indication of a respective occupancy label for each cell from the set of cells, wherein the respective occupancy label includes a first occupancy label indicating a known occupancy status or a second occupancy label indicating an unknown occupancy status, and wherein a subset of cells from the set of cells are associated with the first occupancy label. The one or more processors may be configured to train, using data associated with the aggregated frame, a machine learning model to generate an occupancy grid, wherein training the machine learning model is associated with a loss function that calculates a loss for respective cells from the subset of cells, and wherein the machine learning model is trained to predict a probability of an occupancy status for respective cells from the set of cells. The one or more processors may be configured to provide, to another device, the machine learning model.

Some aspects described herein relate to a device. The device may include one or more memories and one or more processors coupled to the one or more memories. The one or more processors may be configured to receive sensor data associated with a vehicle and a set of frames, wherein the sensor data indicates one or more sensor detections. The one or more processors may be configured to aggregate, using a first pose, the sensor data associated with the set of frames to generate an aggregated frame, wherein the aggregated frame includes a set of cells, and wherein the aggregated frame includes data for a subset of cells associated with the one or more sensor detections. The one or more processors may be configured to generate, using a machine learning model, an occupancy grid, wherein the machine learning model is trained using a loss function that calculates a loss using only cells associated with a known occupancy status, and wherein an output of the machine learning model includes a probability of one or more occupancy statuses for respective cells from the set of cells. The one or more processors may be configured to perform an action based on the occupancy grid.

Some aspects described herein relate to a method. The method may include receiving, by a device, sensor data associated with a vehicle and a set of frames, wherein the sensor data indicates one or more sensor detections. The method may include aggregating, using a first pose, the sensor data associated with the set of frames to generate an aggregated frame, wherein the aggregated frame is associated with a set of cells. The method may include obtaining, by the device, an indication of a respective occupancy label for each cell from the set of cells, wherein the respective occupancy label includes a first occupancy label indicating a known occupancy status or a second occupancy label indicating an unknown occupancy status, and wherein a subset of cells from the set of cells are associated with the first occupancy label. The method may include training, using data associated with the aggregated frame, a machine learning model to generate an occupancy grid, wherein training the machine learning model is associated with a loss function that calculates a loss for respective cells from the subset of cells, and wherein the machine learning model is trained to predict a probability of an occupancy status for respective cells from the set of cells. The method may include providing, by the device and to another device, the machine learning model.

Some aspects described herein relate to a method. The method may include receiving, by a device, sensor data associated with a vehicle and a set of frames, wherein the sensor data indicates one or more sensor detections. The method may include aggregating, using a first pose, the sensor data associated with the set of frames to generate an aggregated frame, wherein the aggregated frame includes a set of cells, and wherein the aggregated frame includes data for a subset of cells associated with the one or more sensor detections. The method may include generating, using a machine learning model, an occupancy grid, wherein the machine learning model is trained using a loss function that calculates a loss using only cells associated with a known occupancy status, and wherein an output of the machine learning model includes a probability of one or more occupancy statuses for respective cells from the set of cells. The method may include performing, by the device, an action based on the occupancy grid.

Some aspects described herein relate to a non-transitory computer-readable medium that stores a set of instructions. The set of instructions, when executed by one or more processors of a device, may cause the device to receive sensor data associated with a vehicle and a set of frames, wherein the sensor data indicates one or more sensor detections. The set of instructions, when executed by one or more processors of the device, may cause the device to aggregate, using a first pose, the sensor data associated with the set of frames to generate an aggregated frame, wherein the aggregated frame is associated with a set of cells. The set of instructions, when executed by one or more processors of the device, may cause the device to obtain an indication of a respective occupancy label for each cell from the set of cells, wherein the respective occupancy label includes a first occupancy label indicating a known occupancy status or a second occupancy label indicating an unknown occupancy status, and wherein a subset of cells from the set of cells are associated with the first occupancy label. The set of instructions, when executed by one or more processors of the device, may cause the device to train, using data associated with the aggregated frame, a machine learning model to generate an occupancy grid, wherein training the machine learning model is associated with a loss function that calculates a loss for respective cells from the subset of cells, and wherein the machine learning model is trained to predict a probability of an occupancy status for respective cells from the set of cells. The set of instructions, when executed by one or more processors of the device, may cause the device to provide, to another device, the machine learning model.

Some aspects described herein relate to a non-transitory computer-readable medium that stores a set of instructions. The set of instructions, when executed by one or more processors of a device, may cause the device to receive sensor data associated with a vehicle and a set of frames, wherein the sensor data indicates one or more sensor detections. The set of instructions, when executed by one or more processors of the device, may cause the device to aggregate, using a first pose, the sensor data associated with the set of frames to generate an aggregated frame, wherein the aggregated frame includes a set of cells, and wherein the aggregated frame includes data for a subset of cells associated with the one or more sensor detections. The set of instructions, when executed by one or more processors of the device, may cause the device to generate, using a machine learning model, an occupancy grid, wherein the machine learning model is trained using a loss function that calculates a loss using only cells associated with a known occupancy status, and wherein an output of the machine learning model includes a probability of one or more occupancy statuses for respective cells from the set of cells. The set of instructions, when executed by one or more processors of the device, may cause the device to perform an action based on the occupancy grid.

Some aspects described herein relate to an apparatus. The apparatus may include means for receiving sensor data associated with a vehicle and a set of frames, wherein the sensor data indicates one or more sensor detections. The apparatus may include means for aggregating, using a first pose, the sensor data associated with the set of frames to generate an aggregated frame, wherein the aggregated frame is associated with a set of cells. The apparatus may include means for obtaining an indication of a respective occupancy label for each cell from the set of cells, wherein the respective occupancy label includes a first occupancy label indicating a known occupancy status or a second occupancy label indicating an unknown occupancy status, and wherein a subset of cells from the set of cells are associated with the first occupancy label. The apparatus may include means for training, using data associated with the aggregated frame, a machine learning model to generate an occupancy grid, wherein training the machine learning model is associated with a loss function that calculates a loss for respective cells from the subset of cells, and wherein the machine learning model is trained to predict a probability of an occupancy status for respective cells from the set of cells. The apparatus may include means for providing, to another device, the machine learning model.

Some aspects described herein relate to an apparatus. The apparatus may include means for receiving sensor data associated with a vehicle and a set of frames, wherein the sensor data indicates one or more sensor detections. The apparatus may include means for aggregating, using a first pose, the sensor data associated with the set of frames to generate an aggregated frame, wherein the aggregated frame includes a set of cells, and wherein the aggregated frame includes data for a subset of cells associated with the one or more sensor detections. The apparatus may include means for generating, using a machine learning model, an occupancy grid, wherein the machine learning model is trained using a loss function that calculates a loss using only cells associated with a known occupancy status, and wherein an output of the machine learning model includes a probability of one or more occupancy statuses for respective cells from the set of cells. The apparatus may include means for performing an action based on the occupancy grid.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
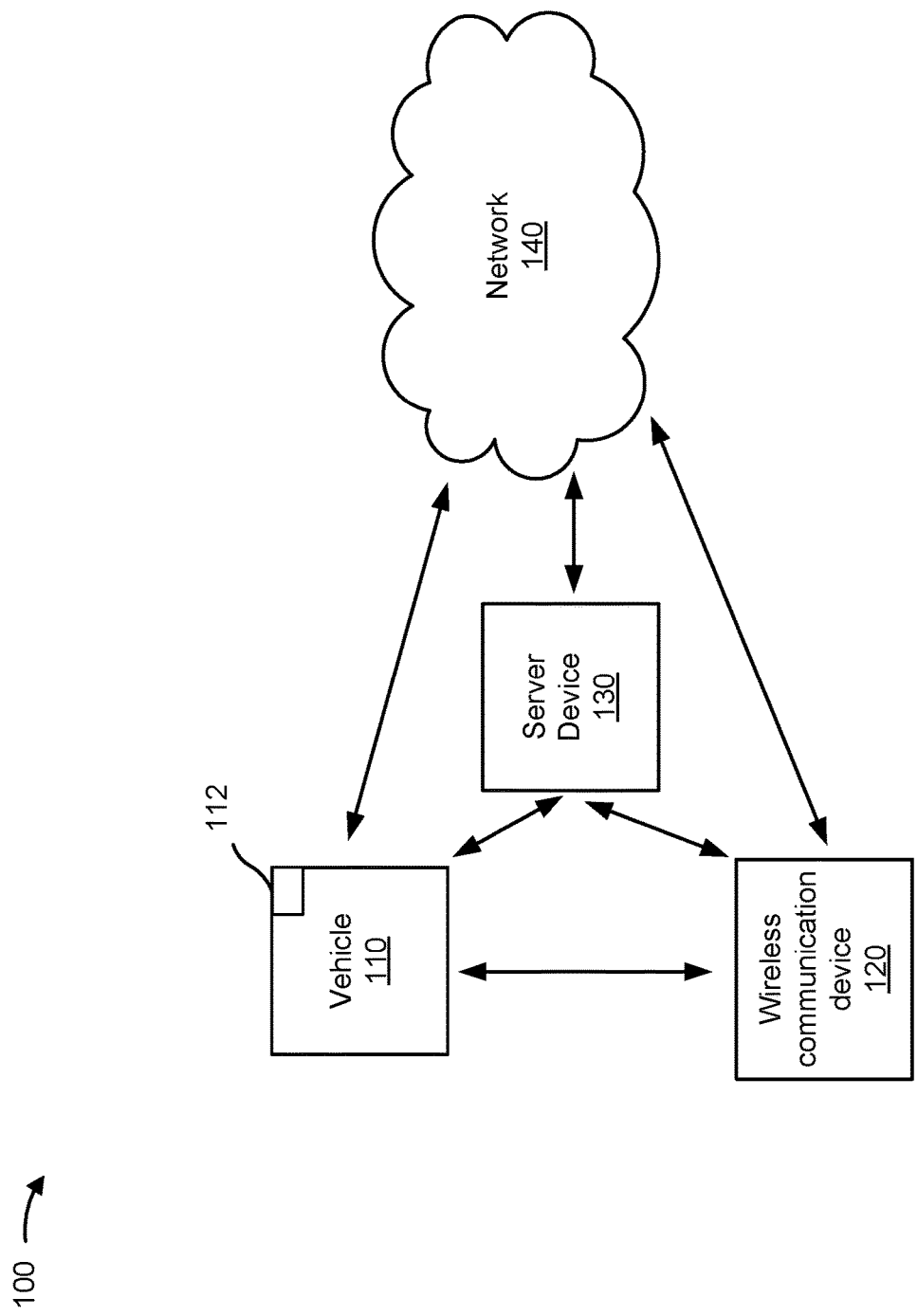
FIG. 1 is a diagram of an example environment in which systems and/or methods described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A vehicle may include a system (e.g., an electronic control unit (ECU), and/or an autonomous driving system) configured to control an operation of the vehicle. The system may use data obtained by one or more sensors of the vehicle to perform occupancy mapping to determine an occupancy status (e.g., unoccupied space, occupied space, and/or drivable space) of the environment surrounding the vehicle. For example, the system may use data obtained by a global navigation satellite system (GNSS)/inertial measurement unit (IMU), a camera, a light detection and ranging (LIDAR) scanner, and/or a radar scanner, among other examples, to determine an occupancy status of the environment surrounding the vehicle. The system may detect drivable space that the vehicle can occupy based on the occupancy status of the environment surrounding the vehicle. The system may be configured to identify, in real-time, the occupancy status of the environment surrounding the vehicle and to determine a drivable space that the vehicle is able to occupy based on the occupancy status of the environment. To perform occupancy and free space detection when using a sensor configured to obtain point data of an object (e.g., a radar sensor, a LIDAR sensor, and/or a camera), the system may subdivide an area of interest (e.g., an area surrounding the vehicle) into a number of uniformly spaced square grids (e.g., occupancy grids). Based on the radar returns, the occupancy status of each grid is determined to generate an occupancy grid. An occupancy grid may include a static occupancy grid (e.g., associated with objects in an environment around the vehicle that are relatively static or not moving) and/or a dynamic occupancy grid (e.g., associated with objects in an environment around the vehicle that are dynamic or moving). However, the system may not account for various limitations of the one or more sensors, which may negatively impact the system's ability to detect the drivable space.

For example, the GNSS/IMU may provide data indicating a position of the vehicle in the environment. The system may couple the data obtained by the GNSS/IMU with a high resolution map to determine an exact location of the vehicle on the map, and may use the map to estimate the occupancy status of the environment surrounding the vehicle and/or to estimate drivable space within the environment. However, the map may not include information associated with recent changes to the environment. For example, the map may not include information associated with construction being performed on a roadway, other vehicles traveling along the roadway, and/or objects, people, and/or animals, among other examples, located on or adjacent to the roadway, among other examples.

The camera may obtain images of the environment surrounding the vehicle. The system may perform object detection to identify objects within the images and may determine an occupancy status of the environment surrounding the vehicle based at least in part on detecting the objects within the images. However, the camera may be a two-dimensional sensor that is not capable, by itself, of measuring a distance at which an object is located from the vehicle. Instead, the system and/or the camera may use one or more algorithms to estimate the distance at which an object depicted in an image is located from the vehicle. Because the distance is estimated, rather than measured, estimation of the velocity of an object may be prone to error and noise. Further, the camera may be sensitive to the environment in which the camera is operating and environmental conditions such as rain, fog, and/or snow, among other examples, may impact the quality of the images captured by the camera.

The LIDAR scanner may use light in the form of a pulsed laser to obtain point data as the LIDAR scanner is rotated. The point data may correspond to a reflection of the light off of an object and may be used to perform three-dimensional (3D) object detection and to determine a velocity of the object. However, radiation safety requirements may limit an amount of energy that the LIDAR scanner transmits. The limits on the amount of energy that the LIDAR scanner is able to transmit may cause the LIDAR scanner to use a scanning regime (e.g., rotation of a laser head, and/or rotation of a galvanic mirror) that focuses all of the energy transmitted by the LIDAR scanner in a limited number of directions. The use of the scanning regime may cause the velocity measurements to be prone to errors resulting from a smearing (e.g., due to scanning) of the LIDAR signal across various segments of an object. Further, the LIDAR scanner may be sensitive to the environment in which the LIDAR scanner is operating and environmental conditions such as rain, fog, and/or snow, among other examples, may impact the quality of the point data obtained by the LIDAR scanner.

The radar scanner may transmit one or more pulses of electromagnetic waves. The one or more pulses may be reflected by an object in a path of the one or more pulses. The reflection may be received by the radar scanner. The radar scanner may determine one or more characteristics (e.g., an amplitude and/or a frequency) associated with the reflected pulses and may determine point data indicating a location of the object based on the one or more characteristics. However, the radar scanner may be associated with poor angular resolution, sparse detections, and/or unreliable behavior, among other examples, which may reduce the effectiveness of object detection data collected by the radar scanner for use in occupancy grid generation.

In some cases, the system may generate an occupancy grid based on obtained sensor data (e.g., camera data, LIDAR data, and/or radar data). The system may analyze the sensor data and generate the occupancy grid using a deterministic approach (e.g., using a deterministic algorithm, such as a Bayesian derived algorithm (e.g., a Bayes algorithm)). However, because of the various limitations of the one or more sensors used to obtain the sensor data (e.g., described above), using a deterministic approach to generate the occupancy grid may result in inaccurate occupancy grid. For example, the system may determine an occupancy status of a cell of the occupancy grid based on information (e.g., sensor data) that is specific to the cell. For example, information from one cell may not impact the occupancy status of another cell. As a result, noise or inaccurate sensor data (or sparse sensor data) may result in an incorrect determination an occupancy status of a cell of the occupancy grid.

As an example, the system may detect a bridge above a road on which the vehicle is traveling (e.g., an overpass bridge). Because the system uses the deterministic approach and information specific to each cell, the system may determine that one or more cells of the occupancy grid in which the bridge is detected are occupied (e.g., not drivable due to a sensor detection). However, the road underneath the bridge may be drivable. However, because the system determined that the occupancy status of the one or more cells of the occupancy grid in which the bridge is detected are occupied (e.g., not drivable due to a sensor detection), the system may incorrectly determine that the road underneath the bridge is not drivable. This may cause the system to perform actions to avoid a passable or drivable road, resulting in an increased risk of collisions (e.g., caused by the vehicle performing unnecessary and/or unexpected maneuvers to avoid a passable or drivable road) and/or poor user experience.

Some aspects described herein enable machine learning-based occupancy grid generation. For example, a system (e.g., of a vehicle) may generate an occupancy grid using obtained sensor data and a machine learning model (e.g., where the sensor data is provided as an input to the machine learning model). In some aspects, the machine learning model may output probabilities of respective occupancy status classes for each cell of the occupancy grid. The system may determine a class associated with an occupancy status for each cell of the occupancy grid (e.g., based on the output of the machine learning model).

In some aspects, the system may use an aggregated frame (e.g., aggregated data) as an input for the machine learning model. For example, as described elsewhere herein, sensory detections may be sparse in time (e.g., for radar sensor detections). Therefore, to increase the data available to be analyzed by the machine learning model, the system may aggregate one or more sensor detections into an aggregated frame. For example, the environment around a vehicle may be divided into a 2D grid (e.g., a frame). The system may aggregate sensor data (e.g., obtained over time) into the frame to generate the aggregated frame. Aggregated frames may be used to train the machine learning model and/or may be used as an input to the machine learning model.

In some aspects, the machine learning model may be trained using one or more loss functions. A loss function may only calculate a loss for cells of an aggregated frame that are associated with a known occupancy status. For example, training data for the machine learning model may include one or more aggregated frames. Each aggregated frame may be associated with one or more cells that are labeled with a known occupancy status (e.g., indicating that the one or more cells are associated with a given class of occupancy status) and with one or more cells that are labeled with an unknown occupancy status (e.g., indicating that an occupancy status of the one or more cells is not known). A system or device may train the machine learning model by using a loss function that calculates loss for the one or more cells that are labeled with a known occupancy status. The system or device may ignore (or refrain from calculating a loss for) the one or more cells that are labeled with an unknown occupancy status. In some aspects, the system or device may apply a penalty weight for one or more cells associated with an incorrect occupancy status determination and/or associated with an incorrect class determination by the machine learning model. In some aspects, the system or device may update one or more weights of the machine learning model based on the calculated loss.

As a result, a system or device may generate an occupancy grid (e.g., a static occupancy grid) using a machine learning model that enables an occupancy status of each cell to be determined using information associated with the cell and information associated with other cells of the occupancy grid. This may improve determinations of an occupancy status and/or of a class of occupancy status for each cell of the occupancy grid. For example, the machine learning model may be configured or trained to output a probability of an occupancy status and/or of a class for each cell of the occupancy grid (e.g., regardless of whether the cell is associated with obtained sensor data that is input to the machine learning model). This improves the accuracy of the occupancy grid because the determination of the occupancy status for each cell accounts for information associated with other cells of the occupancy grid.

Additionally, an accuracy of occupancy status determinations may be improved by aggregating sensor data into an aggregated frame. For example, radar data collected by a vehicle may be sparse in time. Therefore, aggregating the sensor data (e.g., radar data) into an aggregated frame that includes sensor data collected over multiple intervals results in additional available data to be analyzed by the machine learning model. This may improve a training and/or performance of the machine learning model. Further, using a loss function that only calculates loss for cells that are labeled with a known occupancy status improves the accuracy of the training of the machine learning model. For example, a label indicating a known occupancy status (e.g., a ground truth label indicating a known occupancy status) may have improved reliability as compared to a label indicating an unknown occupancy status (e.g., a lack of a ground truth label). In other words, the presence of a positive ground truth label (e.g., such as a label indicating a known occupancy status) may be more reliable than a lack thereof (e.g., such as a label indicating an unknown occupancy status). Therefore, the label of a known occupancy status may be more reliable than the label of an unknown occupancy status. Therefore, calculating the loss only for cells associated with a known occupancy status label may improve a reliability and/or an accuracy of the calculated loss and/or the training of the machine learning model.

FIG. 1 is a diagram of an example environment 100 in which systems and/or methods described herein may be implemented, in accordance with the present disclosure. As shown in FIG. 1, environment 100 may include a vehicle 110 that includes an ECU 112, a wireless communication device 120, a server device 130, and a network 140. Devices of environment 100 may interconnect via wired connections, wireless connections, or a combination of wired and wireless connections.

The vehicle 110 may include any vehicle that is capable of transmitting and/or receiving data associated with machine learning-based occupancy grid generation according to camera data, radar data, and/or LIDAR data, among other examples, as described herein. For example, the vehicle 110 may be a consumer vehicle, an industrial vehicle, and/or a commercial vehicle, among other examples. The vehicle 110 may be capable of traveling and/or providing transportation via public roadways, and/or may be capable of use in operations associated with a worksite (e.g., a construction site), among other examples. The vehicle 110 may include a sensor system that includes one or more sensors that are used to generate and/or provide vehicle data associated with vehicle 110 and/or a radar scanner and/or a LIDAR scanner that is used to obtain point data used for road scene understanding in autonomous driving.

The vehicle 110 may be controlled by the ECU 112, which may include one or more devices capable of receiving, generating, storing, processing, and/or providing information associated with occupancy clustering according to point data (e.g., data obtained by a radar scanner, a LIDAR scanner, and/or a camera) and/or road scene understanding described herein. For example, the ECU 112 may be associated with an autonomous driving system and/or may include and/or be a component of a communication and/or computing device, such as an onboard computer, a control console, an operator station, or a similar type of device. The ECU 112 may be configured to communicate with an autonomous driving system of the vehicle 110, ECUs of other vehicles, and/or other devices. For example, advances in communication technologies have enabled vehicle-to-everything (V2X) communication, which may include vehicle-to-vehicle (V2V) communication, and/or vehicle-to-pedestrian (V2P) communication, among other examples. In some aspects, the ECU 112 may receive vehicle data associated with the vehicle 110 (e.g., location information, sensor data, radar data, and/or LIDAR data) and perform machine learning-based occupancy grid generation to determine the occupancy status of the environment surrounding the vehicle 110 and to determine a drivable space that the vehicle is able to occupy based on the occupancy status of the environment based on the vehicle data, as described herein.

The wireless communication device 120 includes one or more devices capable of receiving, generating, storing, processing, and/or providing information associated with machine learning-based occupancy grid generation, as described elsewhere herein. For example, the wireless communication device 120 may include a base station, and/or an access point, among other examples. Additionally, or alternatively, the wireless communication device 120 may include a communication and/or computing device, such as a mobile phone (e.g., a smart phone, and/or a radiotelephone), a laptop computer, a tablet computer, a handheld computer, a desktop computer, a gaming device, a wearable communication device (e.g., a smart wristwatch, and/or a pair of smart eyeglasses), and/or a similar type of device.

The server device 130 may include one or more devices capable of receiving, generating, storing, processing, providing, and/or routing information associated with machine learning-based occupancy grid generation, as described elsewhere herein. The server device 130 may include a communication device and/or a computing device. For example, the server device 130 may include a server, such as an application server, a client server, a web server, a database server, a host server, a proxy server, a virtual server (e.g., executing on computing hardware), or a server in a cloud computing system. In some aspects, the server device 130 may include computing hardware used in a cloud computing environment. In some aspects, the server device 130 may include one or more devices capable of training a machine learning model associated with occupancy grid generation, as described in more detail elsewhere herein.

The network 140 includes one or more wired and/or wireless networks. For example, the network 140 may include a peer-to-peer (P2P) network, a cellular network (e.g., a long-term evolution (LTE) network, a code division multiple access (CDMA) network, an open radio access network (O-RAN), a New Radio (NR) network, a 3G network, a 4G network, a 5G network, or another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a cloud computing network, among other examples, and/or a combination of these or other types of networks. In some aspects, the network 140 may include and/or be a P2P communication link that is directly between one or more of the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
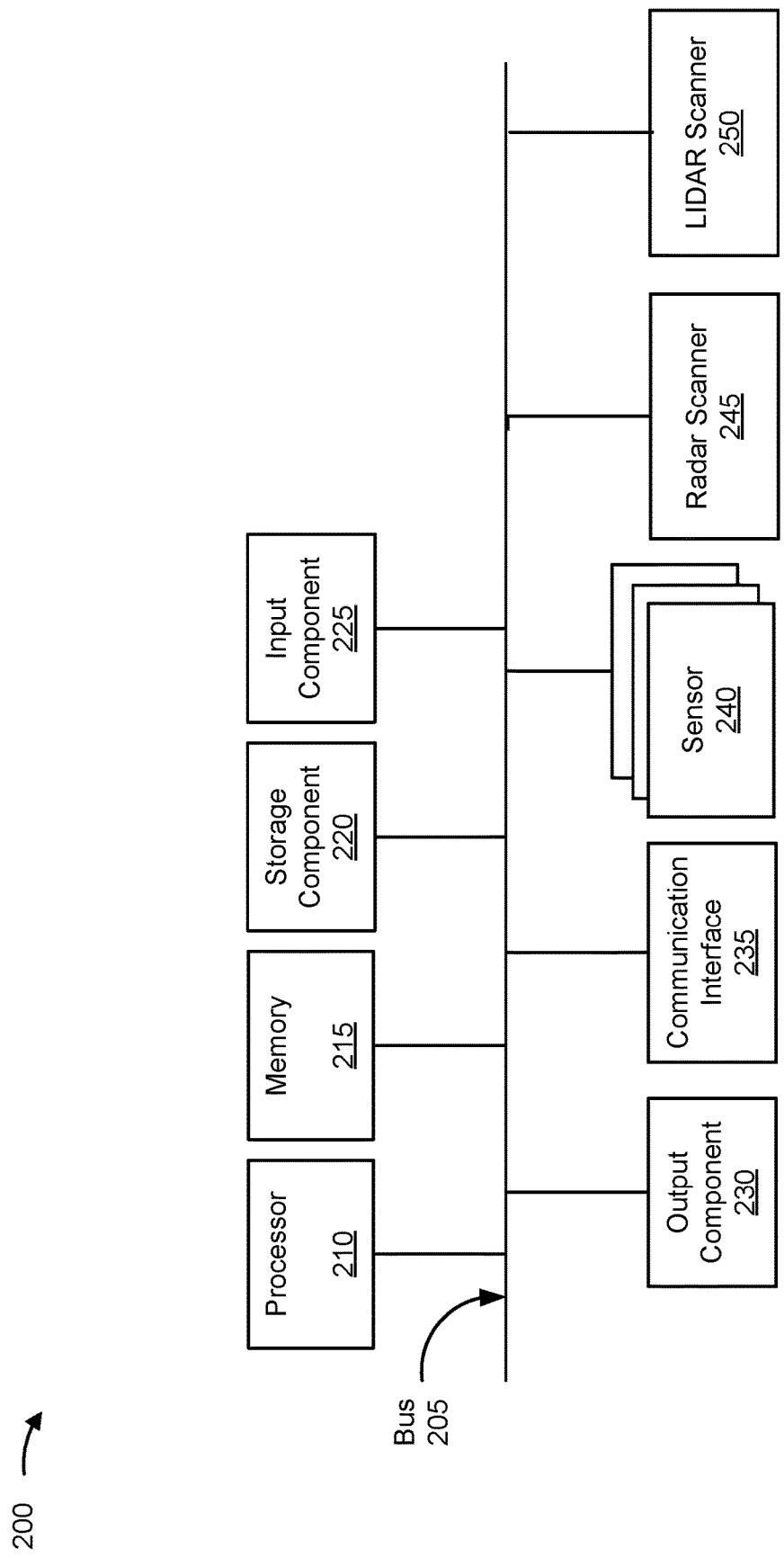
FIG. 2 is a diagram illustrating example components of a device, in accordance with the present disclosure.

FIG. 2 is a diagram illustrating example components of a device 200, in accordance with the present disclosure. Device 200 may correspond to the vehicle 110, the ECU 112, the wireless communication device 120, and/or the server device 130. In some aspects, the vehicle 110, the ECU 112, the wireless communication device 120, and/or the server device 130 may include one or more devices 200 and/or one or more components of device 200. As shown in FIG. 2, device 200 may include a bus 205, a processor 210, a memory 215, a storage component 220, an input component 225, an output component 230, a communication interface 235, one or more sensors 240, a radar scanner 245, and/or a LIDAR scanner 250.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a GNSS component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

The one or more sensors 240 may include one or more devices capable of sensing characteristics associated with the device 200. A sensor 240 may include one or more integrated circuits (e.g., on a packaged silicon die) and/or one or more passive components of one or more flex circuits to enable communication with one or more components of the device 200. The sensor 240 may include an optical sensor that has a field of view in which the sensor 240 may determine one or more characteristics of an environment of the device 200. In some aspects, the sensor 240 may include a camera. For example, the sensor 240 may include a low-resolution camera (e.g., a video graphics array (VGA)) that is capable of capturing images that are less than one megapixel, images that are less than 1216×912 pixels, among other examples. The sensor 240 may be a low-power device (e.g., a device that consumes less than ten milliwatts (mW) of power) that has always-on capability while the device 200 is powered on. Additionally, or alternatively, a sensor 240 may include magnetometer (e.g., a Hall effect sensor, an anisotropic magneto-resistive (AMR) sensor, and/or a giant magneto-resistive sensor (GMR)), a location sensor (e.g., a GPS receiver and/or a local positioning system (LPS) device (e.g., that uses triangulation and/or multi-lateration)), a gyroscope (e.g., a micro-electro-mechanical systems (MEEMS) gyroscope or a similar type of device), an accelerometer, a speed sensor, a motion sensor, an infrared sensor, a temperature sensor, and/or a pressure sensor, among other examples.

The radar scanner 245 may include one or more devices that use radio waves to determine the range, angle, and/or velocity of an object based on radar data obtained by the radar scanner 245. The radar scanner 245 may provide the radar data to the ECU 112 to enable the ECU 112 to perform machine learning-based occupancy grid generation according to the radar data, as described herein.

The LIDAR scanner 250 may include one or more devices that use light in the form of a pulsed laser to measure distances of objects from the LIDAR scanner based on LIDAR data obtained by the LIDAR scanner 250. The LIDAR scanner 250 may provide the LIDAR data to the ECU 112 to enable the ECU 112 to perform machine learning-based occupancy grid generation according to the LIDAR data, as described herein.

The device 200 may perform one or more processes described herein. The device 200 may perform these processes based on the processor 210 executing software instructions stored by a non-transitory computer-readable medium, such as the memory 215 and/or the storage component 220. A computer-readable medium is defined herein as a non-transitory memory device. A memory device includes memory space within a single physical storage device or memory space spread across multiple physical storage devices.

Software instructions may be read into the memory 215 and/or the storage component 220 from another computer-readable medium or from another device via the communication interface 235. When executed, software instructions stored in the memory 215 and/or the storage component 220 may cause the processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, the device 200 includes means for performing one or more processes described herein and/or means for performing one or more operations of the processes described herein. For example, the device 200 may include means for receiving sensor data associated with a vehicle and a set of frames, wherein the sensor data indicates one or more sensor detections; means for aggregating, using a first pose, the sensor data associated with the set of frames to generate an aggregated frame, wherein the aggregated frame is associated with a set of cells; means for obtaining an indication of a respective occupancy label for each cell from the set of cells, wherein the respective occupancy label includes a first occupancy label indicating a known occupancy status or a second occupancy label indicating an unknown occupancy status, and wherein a subset of cells from the set of cells are associated with the first occupancy label; means for training, using data associated with the aggregated frame, a machine learning model to generate an occupancy grid, wherein training the machine learning model is associated with a loss function that calculates a loss for respective cells from the subset of cells, and wherein the machine learning model is trained to predict a probability of an occupancy status for respective cells from the set of cells; and/or means for providing, to another device, the machine learning model, among other examples. Additionally, or alternatively, the device 200 may include means for receiving sensor data associated with a vehicle and a set of frames, wherein the sensor data indicates one or more sensor detections; means for aggregating, using a first pose, the sensor data associated with the set of frames to generate an aggregated frame, wherein the aggregated frame includes a set of cells, and wherein the aggregated frame includes data for a subset of cells associated with the one or more sensor detections; means for generating, using a machine learning model, an occupancy grid, wherein the machine learning model is trained using a loss function that calculates a loss using only cells associated with a known occupancy status, and wherein an output of the machine learning model includes a probability of one or more occupancy statuses for respective cells from the set of cells; and/or means for performing an action based on the occupancy grid, among other examples. In some aspects, such means may include one or more components of the device 200 described in connection with FIG. 2, such as the bus 205, the processor 210, the memory 215, the storage component 220, the input component 225, the output component 230, the communication interface 235, the one or more sensors 240, the radar scanner 245, and/or the LIDAR scanner 250.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3A:
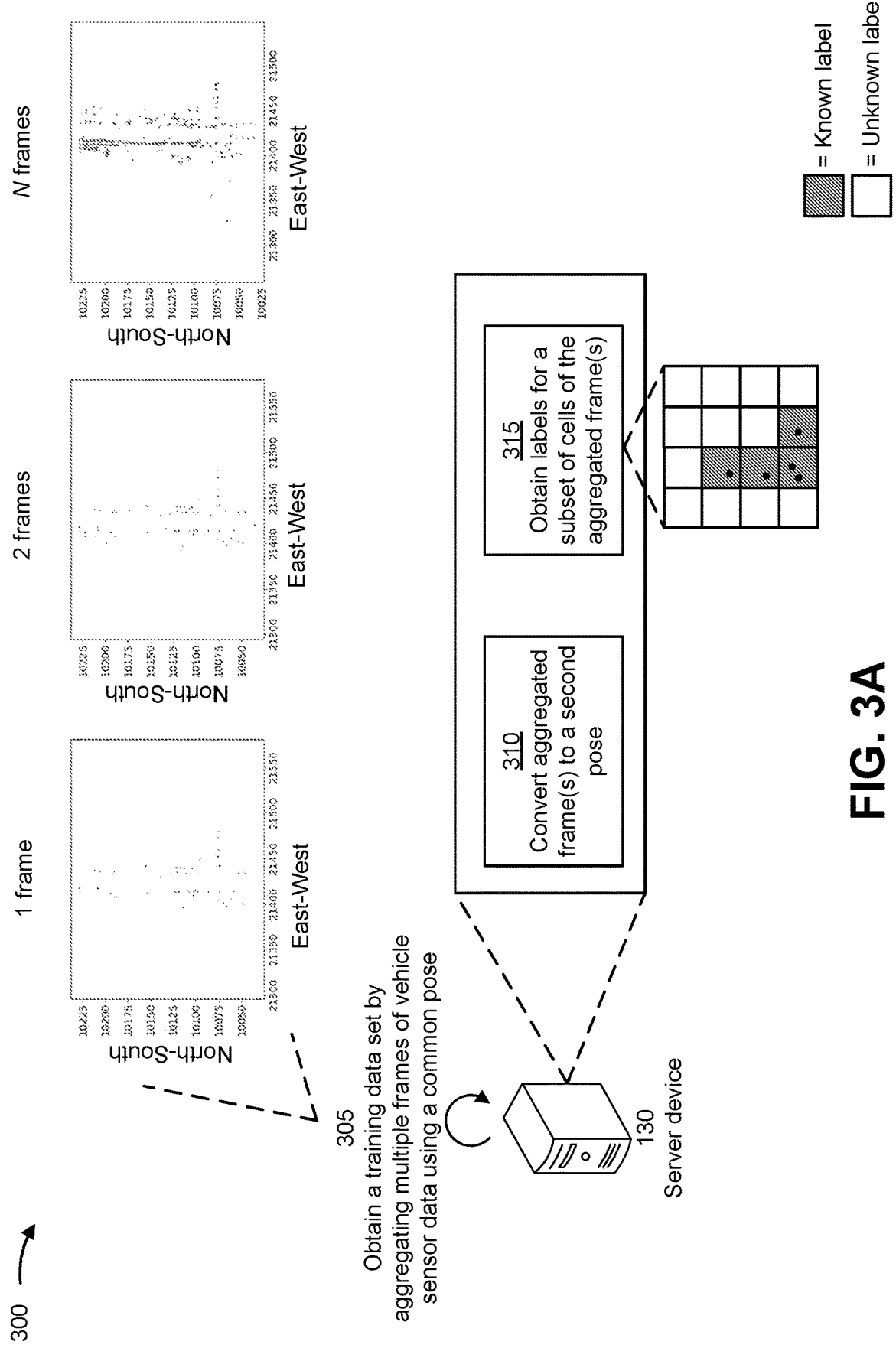
FIGS. 3A-3C are diagrams illustrating an example associated with machine learning-based occupancy grid generation, in accordance with the present disclosure.
Figure 3B:
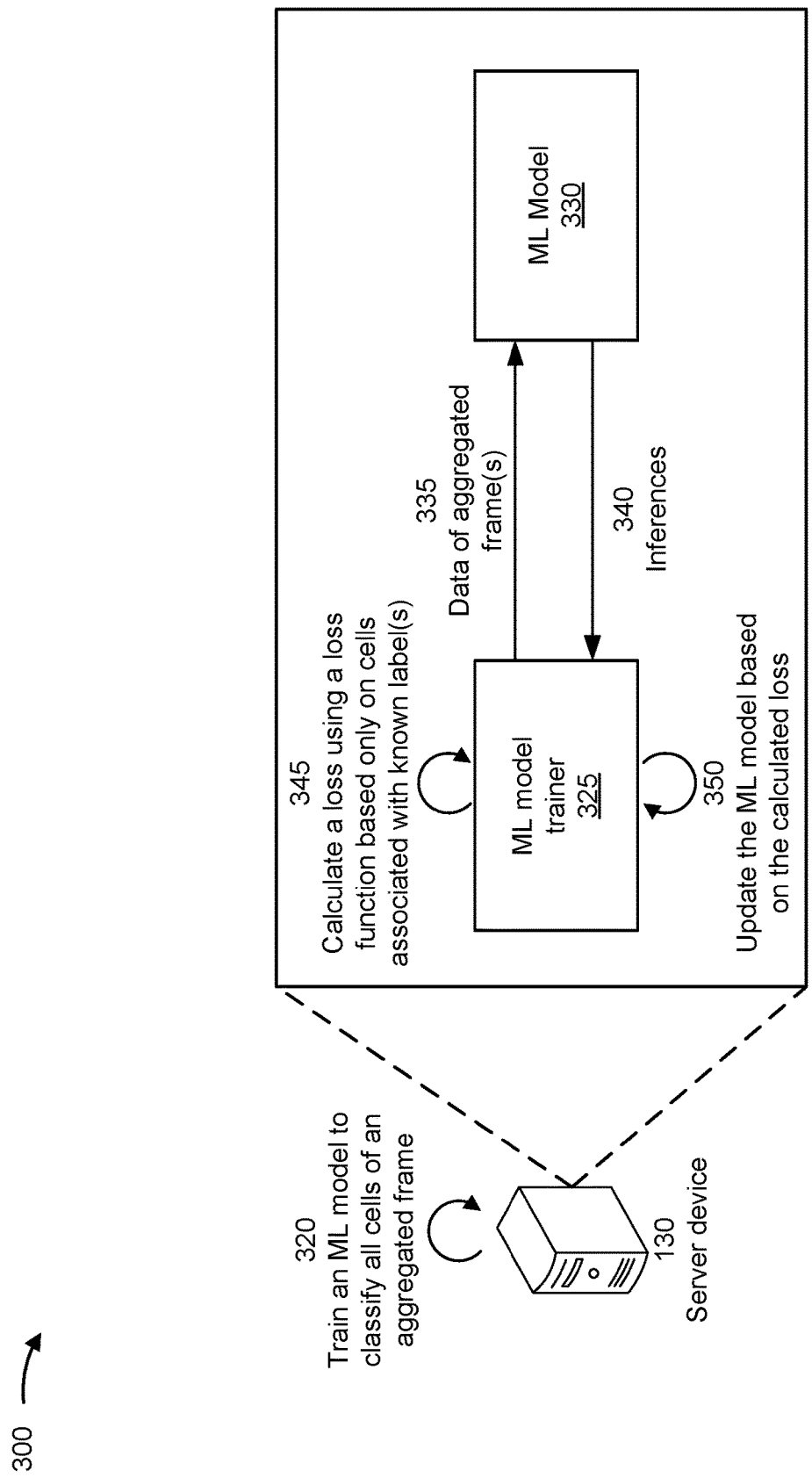
Figure 3C:
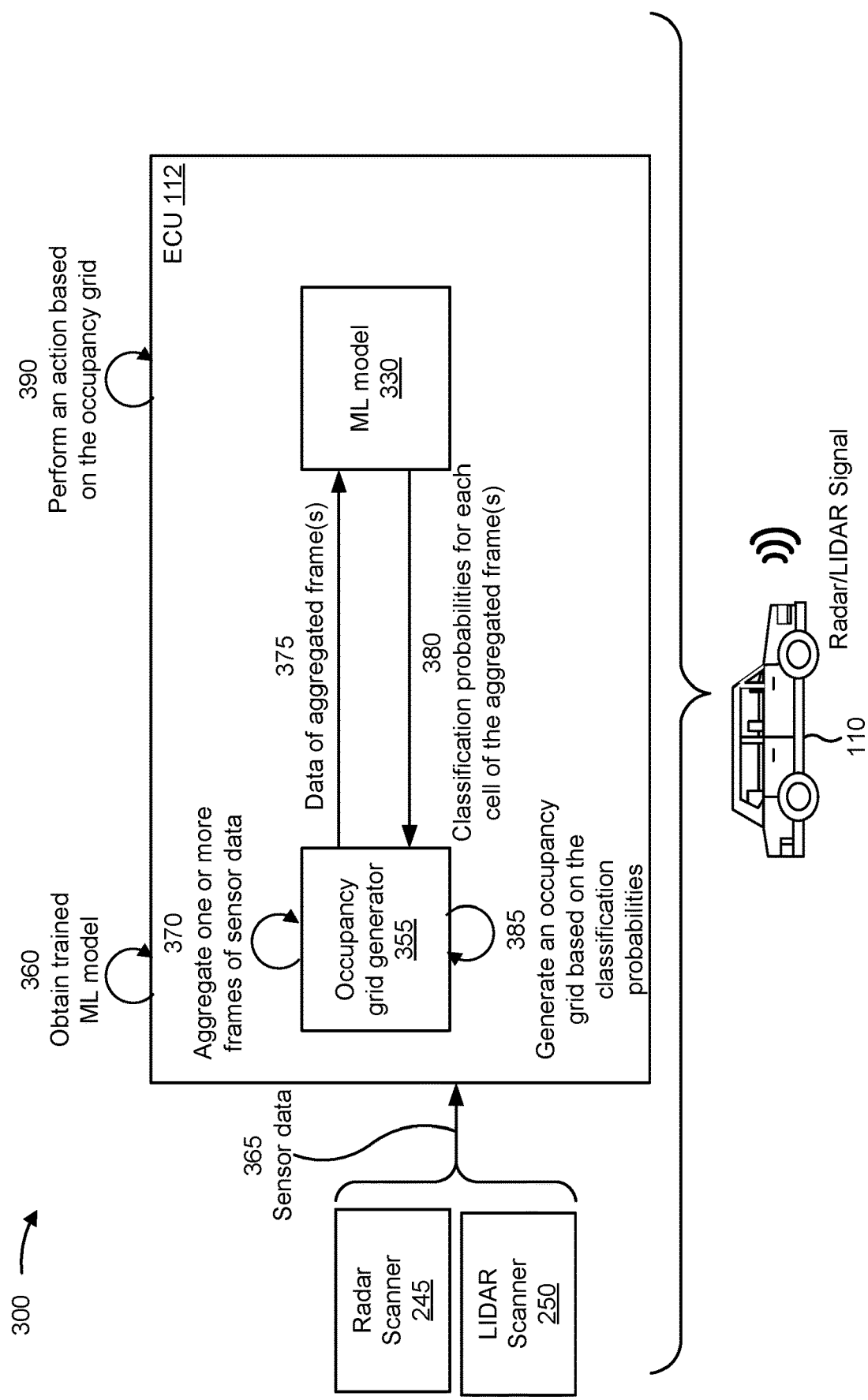

FIGS. 3A-3C are diagrams illustrating an example 300 associated with machine learning-based occupancy grid generation, in accordance with the present disclosure. As shown in FIGS. 3A-3C, example 300 includes the server device 130, the vehicle 110, and the ECU 112. The server device 130 may include a machine learning (ML) model trainer 325. The vehicle 110 and/or the ECU 112 may include an occupancy grid generator 355. The ML model trainer 325 and the occupancy grid generator 355 are described in more detail elsewhere herein.

FIGS. 3A and 3B depict an example associated with training a machine learning model (e.g., an ML model 330) to predict an occupancy status of respective cells associated with an occupancy grid. For example, the ML model 330 may be trained to output a probability indicating a likelihood that a given cell is associated with given class or occupancy status. For example, a class of occupancy status may include a drivable occupancy status or an undrivable occupancy status, among other examples. Additionally, or alternatively, a class of occupancy status may include a road class and a "not a road" class (e.g., associated with cells that include objects that are not a road (e.g., not a drivable area)). The "not a road" class may also be referred to as a "prop" class. As another example, a class of occupancy status may include a background class (e.g., associated with background objects), a parking class (e.g., associated with areas for parking rather than driving), a railway or rail track class, a sidewalk class, a biking lane class, a lane marking class, a pedestrian class, and/or a cross walk or pedestrian walkway class, among other examples.

In some aspects, as shown in the example 300, the ML model 330 may be trained by the server device 130. For example, the ML model 330 may be trained "offline" by the server device 130 prior to being provided to the vehicle 110 and/or the ECU 112. In some other aspects, the ML model 330 may be trained by a device associated with the vehicle 110, such as the ECU 112 or a controller/processor of the vehicle 110, in a similar manner as described herein.

As shown in FIG. 3A, the server device 110 may obtain sensor data associated with one or more vehicles (e.g., such as the vehicle 110). The sensor data may include radar data, LIDAR data, and/or camera data, among other examples. The sensor data may be data collected or obtained by the one or more vehicles. In some aspects, the sensor data may be historical sensor data that is used by the server device 130 to generate a training data set for the ML model 330.

The sensor data may be associated with a set of frames. For example, a frame may be associated with a grid. The grid may define a set of cells associated with the frame. For example, grid information may include information associated with a static fixed coordinate system and a vehicle fixed coordinate system. The static fixed coordinate system may remain unchanged for a time period during which the vehicle 110 travels along a route (e.g., for a time period beginning at a time when the vehicle 110 travels from an initial location of the vehicle 110 and ending at a time when the vehicle 110 reaches a destination, an ignition of the vehicle 110 is moved to an off position, and/or the vehicle 110 is shifted into park). In some aspects, the static fixed coordinate system includes an origin corresponding to an initial location of the vehicle 110 on a map and each axis of the fixed coordinate system may extend in a respective direction that is perpendicular to a direction in which each other axis extends. For example, the static fixed coordinate system may be in an East-North-Up (ENU) format and a first axis may be aligned in an east-west direction (e.g., a coordinate of the first axis increases in value as the vehicle 110 travels east and decreases in value as the vehicle 110 travels west), a second axis may be aligned in a north-south direction (e.g., a coordinate of the second axis increases in value as the vehicle 110 travels north and decreases in value as the vehicle 110 travels south), and/or a third axis may be aligned in an up-down direction (e.g., a coordinate of the third axis increases in value as the vehicle 110 travels upward (e.g., up a ramp of a parking garage) and decreases in value as the vehicle 110 travels downward). The ENU coordinate system is provided as an example, and multiple other coordinate systems may be similarly applicable as described herein.

In some aspects, the static fixed coordinate system may be divided into a grid of a plurality of cells corresponding to respective areas on the map. In some aspects, each cell, of the plurality of cells, may be the same size as the other cells of the plurality of cells. In some other aspects, each cell may not to be the same size. A size of the plurality of cells may be based at least in part on a rate at which a sensor or scanner (e.g., the radar scanner 245 and/or the LIDAR scanner 250) obtains frames of point data (e.g., a size of the plurality of cells may be inversely proportional to a rate at which the sensor or the scanner obtains frames of point data, or a size of the plurality of cells may be proportional to a rate at which the sensor or the scanner obtains frames of point data), and/or a type of area (e.g., rural or urban) associated with the environment surrounding the vehicle 110, among other examples. The rate at which the sensor or the scanner obtains frame of point data may define a duration of the frames, for instance, a time interval between two subsequent frames.

In some aspects, the vehicle fixed coordinate system may have an origin that is located at a current location of the vehicle 110 (e.g., the location of the origin changes as the location of the vehicle 110 changes). Each axis of the vehicle fixed coordinate system may be aligned with a respective axis of the static fixed vehicle system. For example, the vehicle fixed coordinate system may be in an ENU format, and a first axis may be aligned with the first axis of the static fixed coordinate system in the east-west direction, a second axis may be aligned with the second axis of the static fixed coordinate system in the north-south direction, and/or a third axis may be aligned with the third axis of the static fixed coordinate system in the up-down direction.

The vehicle fixed coordinate system may be divided into a grid of a plurality of cells corresponding to respective areas on the map. In some aspects, a size of the plurality of cells of the vehicle fixed coordinate system is the same as the size of the plurality of cells of the static fixed coordinate system. In some aspects, the boundaries of the plurality of cells of the vehicle fixed coordinate system may be aligned with the boundaries of the plurality of cells of the static fixed system. In some aspects, as the vehicle 110 travels along a route, the vehicle fixed coordinate system is shifted by an integer quantity of cells to eliminate any offset between cell borders of cells of the static fixed coordinate system and cells of the vehicle fixed coordinate system.

As shown by reference number 305, the server device 130 may obtain a training data set (e.g., for the ML model 330) by aggregating multiple frames of vehicle sensor data using a common pose (e.g., a common coordinate reference system). For example, as shown in FIG. 3A, the server device 130 may aggregate N frames of sensor data to generate an aggregated frame. Each point in a frame may indicate a sensor detection (e.g., a radar detection or a LIDAR detection). For example, the vehicle 110 and/or the ECU 112 may receive point data from a sensor (e.g., the radar scanner 245 and/or the LIDAR scanner 250). The sensor may emit a pulse of energy (e.g., a radio wave, and/or a light wave) in a first direction and may obtain a first frame of point data based at least in part on a reflection of the pulse of energy off of an object. The sensor may emit a pulse of energy in a second direction and may obtain a second frame of point data. The sensor may continue in a similar manner to obtain a series of frames of point data corresponding to one or more objects located in the environment surrounding the vehicle 110.

The sensor may provide one or more of the frames of point data to the ECU 112. In some aspects, the sensor may provide a frame of point data to the ECU 112 based at least in part on obtaining the frame of point data. In some aspects, the sensor provides a group of frames of point data to the ECU 112. In some aspects, the group of frames of point data includes each frame of point data obtained by the sensor as the sensor rotates 360 degrees (e.g., a complete point cloud of point data).

In some aspects, a frame of point data includes one or more instances of point data. "Point data" and "sensor data" may be used interchangeably herein. Each instance of point data (referred to herein as a "point" or a "point of point data") included in a frame of point data may include one or more characteristics of an object associated with the point of point data. For example, a point of point data may include a set of coordinates (e.g., an x coordinate, a y coordinate, and/or a z coordinate in a Cartesian coordinate system) corresponding to a location of an object, a set of velocities (e.g., a velocity in a direction corresponding to a first axis of a coordinate system (e.g., $V_x$), a velocity in a direction corresponding to a second axis of a coordinate system (e.g., $V_y$), and/or a velocity in a direction corresponding to a third axis of a coordinate system (e.g., $V_z$)) associated with the object, an indication of a probability of existence associated with the object, and/or an indication of a size of an object that is represented by set of points (e.g., a radar cross section associated with the object), among other examples. Additionally, a number of auxiliary parameters may also be provided in the point data, for example, additional information about the dynamic properties of the point. For example, each cell of a frame may be associated with point data or sensor data. The sensor data for a cell may include one or more radar cross section values (e.g., a minimum radar cross section value, a maximum radar cross section value, and/or a mean radar cross section value), one or more object velocity values associated with the one or more objects that are associated with the cell (e.g., a minimum velocity value associated with the one or more objects, a maximum velocity value associated with the one or more objects, and/or a mean velocity value associated with the one or more objects), a coordinate position of at least one sensor detection (e.g., associated with the one or more objects), a quantity of sensor detections (e.g., a quantity of points within the cell and/or a quantity of radar or LIDAR detections within the cell), and/or an ego velocity value (e.g., a velocity of the vehicle 110), among other examples.

The server device 130 may obtain a set of frames (e.g., one or more frames) of sensor data and/or point data (e.g., that is generated or obtained by the vehicle 110 and/or the ECU 112 in a similar manner as described above). The server device 130 may aggregate the set of frames to generate an aggregated frame. The server device 130 may aggregate the set of frames using a first pose or a first coordinate reference system. For example, the server device 130 may aggregate the set of frames using a common coordinate reference frame for the set of frames, such as the ENU coordinate system. For example, the server device 130 may aggregate the set of frames using the static fixed coordinate system. This may ensure that the sensor detections and/or points are accurately placed within the aggregated frame with respect to the common coordinate reference frame (e.g., the static fixed coordinate system). Aggregating the set of frames may increase a quantity of point data and/or sensor data that is available to train the ML model 330. This may improve the reliability and/or accuracy of the training data associated with the ML model 330. For example, providing more data to the ML model 330 may enable the ML model 330 to make improved inferences and/or predictions associated with an occupancy status of respective cells included in the aggregated frame.

In some aspects, as shown by reference number 310, the server device 130 may convert the aggregated frame (or one or more aggregated frames) from the first pose to a second pose (e.g., a second coordinate reference system). For example, after aggregating the sensor data and/or point data from the set of frames (e.g., using the first pose or the first coordinate reference system), the server device 130 may place the sensor data and/or point data onto the grid (e.g., of the aggregated frame) using a second pose or a second coordinate reference system. For example, the second pose may be a coordinate reference frame of a current position of the vehicle 110. For example, the second pose or the second coordinate reference system may be the vehicle fixed coordinate system. In some aspects, the second pose or the second coordinate reference system may be a unified localization and mapping (ULM) pose. For example, the vehicle 110 and/or the ECU 112 may track the movement of the vehicle 110 so that the vehicle 110 and/or the ECU 112 can track the position of the vehicle 110 (e.g., a pose of the vehicle 110) during aggregation of the set of frames. This enables the server device 130, the vehicle 110, and/or the ECU 112 to aggregate the set of frames using a common frame of reference. The aggregated frame may be input to the ML model 330 in a different frame of reference (e.g., the second pose or the second coordinate reference system). In some aspects, the server device 130 may train the ML model 330 using the aggregated frame in the second pose as an input. For example, one or more aggregated frames (e.g., converted to the second pose or the second coordinate reference system) may be provided as inputs to the ML model 330. Converting the aggregated frame into the second pose or the second coordinate reference system provides additional flexibility for the server device 130 (or any other device training the ML model 330) to aggregate the sensor data using a first frame of reference and to train the ML model 330 using a second frame of reference (e.g., the server device 130, the vehicle 110, and/or the ECU 112 are not limited to a specific, pre-defined frame of reference for data provided to the ML model 330).

As shown by reference number 315, the server device 130 may obtain labels for a subset of cells of the one or more aggregated frames. For example, the server device 130 may obtain an indication of a known label for a subset of cells from a set of cells associated with the grid of the aggregated frame. In some aspects, the server device 130 may obtain an indication of a respective occupancy label for each cell from the set of cells. The respective occupancy label may include a first occupancy label indicating a known occupancy status (e.g., "known label" as shown in FIG. 3A) or a second occupancy label indicating an unknown occupancy status (e.g., "unknown label" as shown in FIG. 3A). For example, the occupancy label(s) may be ground truth labels for training the ML model 330. In some aspects, a known occupancy status label may be associated with a positive ground truth label (e.g., a value greater than zero). An unknown occupancy status label may be associated with a ground truth label value of zero.

The known occupancy status label may indicate that a cell is associated with a known class of occupancy status. For example, if a cell is associated with a sensor detection that is associated with a given class (e.g., a road class, a not a road class, a background class, a parking class, a railway or rail track class, a sidewalk class, a biking lane class, a lane marking class, a pedestrian class, and/or a cross walk or pedestrian walkway class, among other examples), then the cell may be labeled with a known occupancy label for the given class (e.g., a ground truth label value of "1" for the given class). If a cell is not associated with a sensor detection and/or is not associated with a known class, then the cell may be labeled with an unknown occupancy label (e.g., a ground truth label value of "0"). For example, an array may be generated for each class indicating ground truth labels for the aggregated frame and a given class of occupancy status. A value of "1" in an entry of the array may indicate that a cell corresponding to the entry is associated with a known occupancy label for the class associated with the array. A value of "0" in an entry of the array may indicate that a cell corresponding to the entry is associated with an unknown occupancy label for the class associated with the array. The server device 130 may obtain occupancy status labels for the aggregated frame for one or more classes. For example, the server device 130 may obtain occupancy status labels for the aggregated frame for a road class and a not a road class, among other examples.

In some aspects, the server device 130 may obtain the occupancy status labels based on user input. For example, a user may label the cells to facilitate training the ML model 330 to categorize an occupancy status of each cell of an aggregated frame, as described in more detail elsewhere herein. In some aspects, the server device 130 may determine the occupancy status labels for the aggregated frame for one or more classes based on analyzing the sensor detections and/or points included in the aggregated frame.

As shown in FIG. 3B, and by reference number 320, the server device 130 may train the ML model 330 to classify a class of an occupancy status for all cells of an aggregated frame. The server device 130 (and/or the ML model trainer 325) may train, using data associated with the aggregated frame, the ML model 330 to generate an occupancy grid. As described elsewhere herein, the occupancy grid may be a static occupancy grid or a dynamic occupancy grid. For example, the ML model trainer 325 may be a component of the server device 130 that is configured to train the ML model 330 based at least in part on data associated with an aggregated frame. For example, the aggregated frame may be associated with sensor data or point data for each cell of the aggregated frame that includes a sensor detection (e.g., a radar detection and/or a LIDAR detection).

For example, as shown by reference number 335, the model trainer 325 may provide data of one or more aggregated frames as an input to the ML model 330. For example, a cell of an aggregated frame may be associated with data. In some aspects, a subset of cells, from the set of cells of the aggregated frame, may be associated with data (e.g., sensor data). The data may include one or more radar cross section values (e.g., a minimum radar cross section value, a maximum radar cross section value, and/or a mean radar cross section value), one or more object velocity values associated with the one or more objects that are associated with the cell (e.g., a minimum velocity value associated with the one or more objects, a maximum velocity value associated with the one or more objects, and/or a mean velocity value associated with the one or more objects), a coordinate position of at least one sensor detection (e.g., associated with the one or more objects), a quantity of sensor detections (e.g., a quantity of points within the cell and/or a quantity of radar or LIDAR detections within the cell), and/or an ego velocity value (e.g., a velocity of the vehicle 110), among other examples. The ML model 330 may predict a probability of a class of occupancy status for each cell of the aggregated frame based on the data of the aggregated frame.

As shown by reference number 340, the ML model 330 may output one or more inferences. For example, the one or more inferences may include a probability of a class of occupancy status for each cell of the aggregated frame. For example, the ML model 330 may output an indication of a class (e.g., road, not a road, and/or another class described herein) associated with respective cells from the set of cells included in the aggregated frame. As shown by reference number 345, the ML model trainer 325 may calculate a loss using a loss function based only on cells associated with known occupancy labels. For example, as described elsewhere herein, a subset of cells included in the aggregated frame may be associated with known occupancy labels. Training the machine learning model may be associated with a loss function that calculates a loss for respective cells from the subset of cells (e.g., and not for cells associated with an unknown occupancy status label).

For example, the ML model trainer 325 may calculate, using the loss function, the loss for the respective cells from the subset of cells. The ML model trainer 325 may refrain from calculating a loss for respective cells associated with the second occupancy label (e.g., cells associated with an unknown occupancy status and/or a ground truth value of "0"). In some aspects, the ML model trainer 325 may calculate a loss using loss functions for respective classes of occupancy statuses. For example, the loss function may include a first loss function associated with a first class (e.g., a drivable occupancy status) and a second loss function associated with a second class (e.g., an undrivable occupancy status), among other examples. For example, the ML model trainer 325 compare ground truth values for each class to the output of the ML model 330. The ML model trainer 325 may calculate a loss for each class of occupancy status using only cells associated with a positive ground truth value for a given class.

For example, a ground truth label indicating a known occupancy status or class may be more reliable than a ground truth label indicating an absence of a known occupancy status or class (e.g., an unknown occupancy status label) for classifying an occupancy status of a given cell. For example, a cell labeled with an unknown occupancy status label may be associated with a class of occupancy status, but the sensor data may not have detected any sensor detections in the set of frames associated with the aggregated frame for that cell. Therefore, relying on that cell as not being associated with an occupancy status or a class may result in inaccurate training of the ML model 330. Therefore, using one or more loss functions that only calculate a loss for cells of the aggregated frame that are associated with a known occupancy status label may improve the accuracy of the training of the ML model 330.

In some aspects, the ML model trainer 325 may identify, from an output of the machine learning model, one or more cells, from the set of cells, that are associated with an incorrect occupancy status or an incorrect class from known occupancy status classes. For example, the ML model trainer 325 may identify whether any cells are classified as a first class based on an output of the ML model 330 and classified as a second class based on ground truth labels. The ML model trainer 325 may apply, for a loss function of the second class, a penalty weight for the one or more cells. For example, when calculating the loss for the second class, the ML model trainer 325 may apply a penalty for the cells associated with an incorrect occupancy status or an incorrect class from known occupancy status classes (e.g., for one or more cells being classified as a road class when a ground truth label indicates a "not a road" class or vice versa). For example, because the loss is calculated only for cells associated with the known occupancy status label(s), training of the ML model 330 may result in cells that are located proximate to cells associated with the known occupancy status being classified as a class of the nearby cells. However, if the cells that are located proximate to cells associated with the known occupancy status are actually associated with a different occupancy status class, this classification may be incorrect and may degrade the performance and/or accuracy of the ML model 330. Therefore, to mitigate the risk of misclassification or mislabeling caused by the use of the loss functions described herein, the ML model trainer 325 may apply a penalty for the cells associated with an incorrect occupancy status or an incorrect class from known occupancy status classes.

As shown by reference number 350, the ML model trainer 325 and/or the server device 130 may update, based on the loss for the respective cells from the subset of cells, one or more weights associated with the ML model 330. For example, the ML model 330 may include a neural network and the ML model trainer 325 and/or the server device 130 may update, based on the loss for the respective cells from the subset of cells, one or more weights of the neural network to improve the performance of the ML model 330. The ML model trainer 325 may continue to train the ML model 330 by providing data of one or more aggregated frames as an input to the ML model 330 and calculating a loss for one or more classes of occupancy status in a similar manner as described above until a training criteria is met.

As shown in FIG. 3C, the vehicle 110 and/or the ECU 112 may include the occupancy grid generator 355. The occupancy grid generator 355 may be a component of the vehicle 110 and/or of the ECU 112 that is configured to generate an occupancy grid based on an output of the ML model 330. For example, as shown by reference number 360, the vehicle 110 and/or the ECU 112 may obtain the ML model 330 (e.g., after the ML model 330 is trained as described in more detail elsewhere herein). For example, the vehicle 110 and/or the ECU 112 may obtain the ML model 330 from the server device 130 (e.g., the vehicle 110 and/or the ECU 112 may download the trained ML model 330 from the server device 130). In other aspects, the vehicle 110 and/or the ECU 112 may not obtain the ML model 330. For example, the ML model 330 may be maintained by another device, such as the server device 130. The vehicle 110 and/or the ECU 112 may provide data (e.g., data associated with an aggregated frame) to the other device. The other device may input the data into the ML model 330. In such examples, the other device may transmit, and the vehicle 110 and/or the ECU 112 may receive, an output of the ML model 330.

As shown by reference number 365, the vehicle 110 may obtain sensor data and/or point data collected by the radar scanner 245 and/or the LIDAR scanner 250, among other examples. The sensor data may indicate one or more sensor detections (e.g., one or more radar detections and/or one or more LIDAR detections). For example, the ECU 112 may receive sensor data and/or point data from the radar scanner 245 and/or the LIDAR scanner 250. The sensor data may identify a plurality of points corresponding to one or more objects located in a physical environment of the vehicle 110.

For example, the radar scanner 245 may send out one or more pulses of electromagnetic waves. The one or more pulses may be reflected by an object in a path of the one or more pulses. The reflection may be received by the radar scanner 245. The radar scanner 245 may determine one or more characteristics (e.g., an amplitude, a frequency, and/or the like) associated with the reflected pulses and may determine point data indicating a location of the object based on the one or more characteristics. The radar scanner 245 may provide the point data to the ECU 112 indicating a radar detection.

Additionally, or alternatively, the LIDAR scanner 250 may send out one or more pulses of light. The one or more pulses may be reflected by an object in a path of the one or more pulses. The reflection may be received by the LIDAR scanner 250. The LIDAR scanner 250 may determine one or more characteristics associated with the reflected pulses and may determine point data indicating a location of the object based on the one or more characteristics. The LIDAR scanner 250 may provide the point data to the ECU 112 indicating a LIDAR detection.

As shown by reference number 370, the vehicle 110 and/or the ECU 112 may aggregate, using a first pose (e.g., a common coordinate reference system), the sensor data associated with the set of frames to generate an aggregated frame. For example, the vehicle 110 and/or the ECU 112 may aggregate the sensor data in a similar manner as described in more detail elsewhere herein, such as in connection with FIG. 3A. For example, the vehicle 110 and/or the ECU 112 may obtain a set of frames (e.g., one or more frames) of sensor data and/or point data. The vehicle 110 and/or the ECU 112 may aggregate the set of frames to generate an aggregated frame. The vehicle 110 and/or the ECU 112 may aggregate the set of frames using a first pose or a first coordinate reference system. For example, the vehicle 110 and/or the ECU 112 may aggregate the set of frames using a common coordinate reference frame for the set of frames, such as the ENU coordinate system. This may ensure that the sensor detections and/or points are accurately placed within the aggregated frame with respect to the common coordinate reference frame (e.g., the static fixed coordinate system). Aggregating the set of frames may increase a quantity of point data and/or sensor data that is available to be analyzed by the ML model 330. This may improve the reliability and/or accuracy of an output of the ML model 330. For example, providing more data to the ML model 330 may enable the ML model 330 to make improved inferences and/or predictions associated with an occupancy status of respective cells included in the aggregated frame.

In some aspects, the vehicle 110 and/or the ECU 112 may convert the aggregated frame (or one or more aggregated frames) from the first pose to a second pose (e.g., a second coordinate reference system). For example, after aggregating the sensor data and/or point data from the set of frames (e.g., using the first pose or the first coordinate reference system), the vehicle 110 and/or the ECU 112 may place the sensor data and/or point data onto the grid (e.g., of the aggregated frame) using a second pose or a second coordinate reference system. For example, the second pose may be a coordinate reference frame of a current position of the vehicle 110. For example, the second pose or the second coordinate reference system may be the vehicle fixed coordinate system. In some aspects, the second pose or the second coordinate reference system may be a ULM pose. For example, the vehicle 110 and/or the ECU 112 may track the movement of the vehicle 110 so that the vehicle 110 and/or the ECU 112 can track the position of the vehicle 110

(e.g., a pose 110) during aggregation of the set of frames. This enables the vehicle 110, and/or the ECU 112 to aggregate the set of frames using a common frame of reference. The aggregated frame may be input to the ML model 330 in a different frame of reference (e.g., the second pose or the second coordinate reference system).

As shown by reference number 375, the occupancy grid generator 355 may provide data associated with the aggregated frame to the ML model 330 as an input. The ML model 330 may determine probabilities associated with respective classes of occupancy status. For example, based on the data associated with the aggregated frame, the ML model 330 may be trained (e.g., as described in more detail elsewhere herein) to predict probabilities associated with respective classes of occupancy status for each cell of the aggregated frame. As an example, for a given cell, an output of the ML model 330 may indicate the cell has a 75% probability of being associated with a road class and a 25% probability of being associated with a "not a road" class. The ML model 330 may predict probabilities for each cell of the aggregated frame in a similar manner. These classes are provided as an example and the ML model 330 may be trained to predict probabilities for additional and/or different classes, as described elsewhere herein.

As shown by reference number 380, the occupancy grid generator 355 may obtain classification probabilities for each cell of the aggregated frame(s). This may enable the occupancy grid generator 355 to determine an occupancy status for each cell of an occupancy grid. For example, as compared to deterministic approaches for generating the occupancy grid (e.g., where sensor data may be needed to identify an occupancy status of a given cell), the occupancy grid generator 355 may be enabled to determine an occupancy status for each cell of an occupancy grid based on the output of the ML model 330. For example, the occupancy grid generator 355 may determine that a given cell is associated with an occupancy status or a class associated with a highest probability as indicated by the output of the ML model 330.

As shown by reference number 385, the occupancy grid generator 355 may generate an occupancy grid based at least in part on the classification probabilities indicated by the ML model 330. For example, the occupancy grid generator 355 may determine an occupancy status and/or a class associated with each cell of the occupancy grid based on the output of the ML model 330. As shown by reference number 390, the vehicle 110 and/or the ECU 112 may perform an action based at least in part on the generated occupancy grid. For example, the vehicle 110 and/or the ECU 112 may control the vehicle 110 according to the occupancy grid (e.g., causing the vehicle 110 to avoid areas associated with a cell that is associated with an undrivable occupancy status). The ECU 112 may perform an action (e.g., accelerating, decelerating, stopping, and/or changing lanes) associated with controlling the vehicle 110 based on location information associated with a cell that is associated with an undrivable occupancy status as indicated by the occupancy grid. In some aspects, the location information indicates a grid location associated with one or more of the cells included in the occupancy grid. The ECU 112 may translate the grid information to an area of the physical environment corresponding to an area of the grid that includes the one or more cells associated with an undrivable occupancy status. In some aspects, the location information indicates an area of the physical environment that is occupied by one or more objects. The area of the physical environment may correspond to an area of the grid that includes the one or more cells associated with an undrivable occupancy status.

In some aspects, performing the action includes the ECU 112 indicating, via a user interface of the vehicle 110 and based at least in part on the location information, a location of the one or more cells associated with an undrivable occupancy status relative to a location of the vehicle 110. For example, the user interface may display a map of the physical environment of the vehicle 110. An origin of the grid may correspond to a current location of the vehicle 110. The ECU 112 may cause information associated with the one or more cells associated with an undrivable occupancy status (e.g., an icon and/or another type of information corresponding to a class of the one or more cells) to be displayed on the map at a location corresponding to a location of the one or more cells in the grid in conjunction with information associated with the current location of the vehicle 110.

As indicated above, FIGS. 3A-3C are provided as examples. Other examples may differ from what is described with respect to FIGS. 3A-3C.

Figure 4:
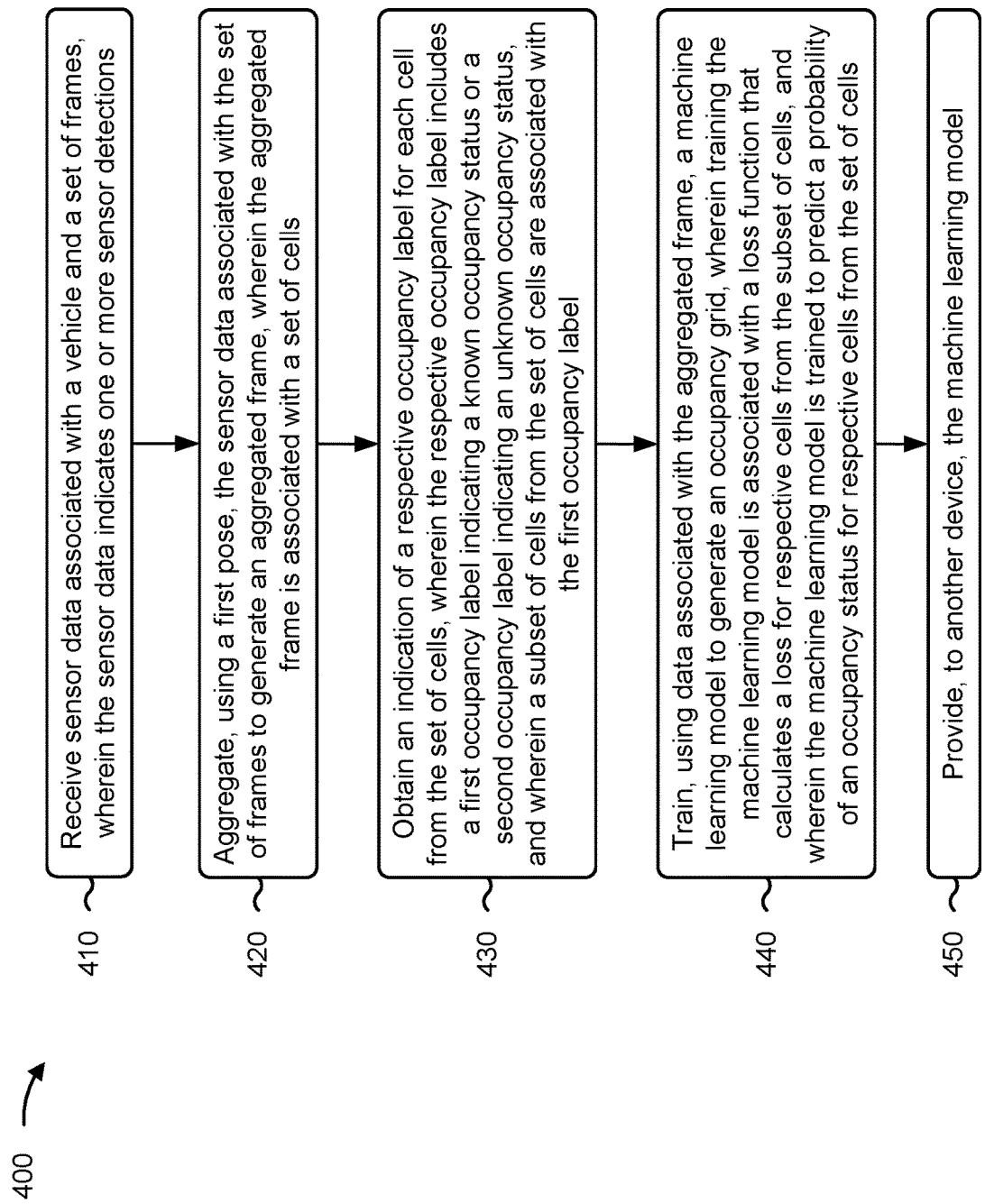
FIG. 4 is a flowchart of an example process associated with machine learning-based occupancy grid generation, in accordance with the present disclosure.

FIG. 4 is a flowchart of an example process 400 associated with machine learning-based occupancy grid generation, in accordance with the present disclosure. In some aspects, one or more process blocks of FIG. 4 are performed by a server device (e.g., server device 130). In some aspects, one or more process blocks of FIG. 4 are performed by another device or a group of devices separate from or including the server device, such as the vehicle 110, the ECU 112, and/or the wireless communication device 120. Additionally, or alternatively, one or more process blocks of FIG. 4 may be performed by one or more components of device 200, such as processor 210, memory 215, storage component 220, input component 225, output component 230, communication interface 235, one or more sensors 240, the radar scanner 245, and/or the LIDAR scanner 250.

As shown in FIG. 4, process 400 may include receiving sensor data associated with a vehicle and a set of frames, wherein the sensor data indicates one or more sensor detections (block 410). For example, the server device may receive sensor data associated with a vehicle and a set of frames, wherein the sensor data indicates one or more sensor detections, as described above. In some aspects, the sensor data indicates one or more sensor detections.

As further shown in FIG. 4, process 400 may include aggregating, using a first pose, the sensor data associated with the set of frames to generate an aggregated frame, wherein the aggregated frame is associated with a set of cells (block 420). For example, the server device may aggregate, using a first pose, the sensor data associated with the set of frames to generate an aggregated frame, wherein the aggregated frame is associated with a set of cells, as described above. In some aspects, the aggregated frame is associated with a set of cells.

As further shown in FIG. 4, process 400 may include obtaining an indication of a respective occupancy label for each cell from the set of cells, wherein the respective occupancy label includes a first occupancy label indicating a known occupancy status or a second occupancy label indicating an unknown occupancy status, and wherein a subset of cells from the set of cells are associated with the first occupancy label (block 430). For example, the server device may obtain an indication of a respective occupancy label for each cell from the set of cells, wherein the respective occupancy label includes a first occupancy label indicating a known occupancy status or a second occupancy label indicating an unknown occupancy status, and wherein a subset of cells from the set of cells are associated with the first occupancy label, as described above. In some aspects, the respective occupancy label includes a first occupancy label indicating a known occupancy status or a second occupancy label indicating an unknown occupancy status. In some aspects, a subset of cells from the set of cells are associated with the first occupancy label.

As further shown in FIG. 4, process 400 may include training, using data associated with the aggregated frame, a machine learning model to generate an occupancy grid, wherein training the machine learning model is associated with a loss function that calculates a loss for respective cells from the subset of cells, and wherein the machine learning model is trained to predict a probability of an occupancy status for respective cells from the set of cells (block 440). For example, the server device may train, using data associated with the aggregated frame, a machine learning model to generate an occupancy grid, wherein training the machine learning model is associated with a loss function that calculates a loss for respective cells from the subset of cells, and wherein the machine learning model is trained to predict a probability of an occupancy status for respective cells from the set of cells, as described above. In some aspects, training the machine learning model is associated with a loss function that calculates a loss for respective cells from the subset of cells. In some aspects, the machine learning model is trained to predict a probability of an occupancy status for respective cells from the set of cells.

As further shown in FIG. 4, process 400 may include providing, to another device, the machine learning model (block 450). For example, the server device may provide, to another device, the machine learning model, as described above.

Process 400 may include additional aspects, such as any single aspect or any combination of aspects described below and/or in connection with one or more other processes described elsewhere herein.

In a first aspect, training the machine learning model comprises calculating, using the loss function, the loss for the respective cells from the subset of cells, refraining from calculating a loss for respective cells associated with the second occupancy label, and updating, based on the loss for the respective cells from the subset of cells, one or more weights associated with the machine learning model.

In a second aspect, alone or in combination with the first aspect, the first occupancy label is associated with indicating the occupancy status of the subset of cells, and the occupancy status includes a drivable occupancy status or an undrivable occupancy status.

In a third aspect, alone or in combination with one or more of the first and second aspects, training the machine learning model comprises identifying, from an output of the machine learning model, one or more cells, from the set of cells, that are associated with an incorrect occupancy status from the drivable occupancy status or the undrivable occupancy status, applying, for the loss function, a penalty weight for the one or more cells, and updating, based on an output of the loss function, one or more weights associated with the machine learning model.

In a fourth aspect, alone or in combination with one or more of the first through third aspects, the loss function includes a first loss function associated with the drivable occupancy status and a second loss function associated with the undrivable occupancy status.

In a fifth aspect, alone or in combination with one or more of the first through fourth aspects, process 400 includes converting the aggregated frame from the first pose to a second pose, wherein the first pose is a common coordinate reference frame for the set of frames, and wherein the second pose is a coordinate reference frame of a current position of the vehicle.

In a sixth aspect, alone or in combination with one or more of the first through fifth aspects, the occupancy grid includes at least one of a static occupancy grid or a dynamic occupancy grid.

In a seventh aspect, alone or in combination with one or more of the first through sixth aspects, the sensor data includes at least one of radar data, LIDAR data, or camera data.

Although FIG. 4 shows example blocks of process 400, in some aspects, process 400 includes additional blocks, fewer blocks, different blocks, or differently arranged blocks than those depicted in FIG. 4. Additionally, or alternatively, two or more of the blocks of process 400 may be performed in parallel.

Figure 5:
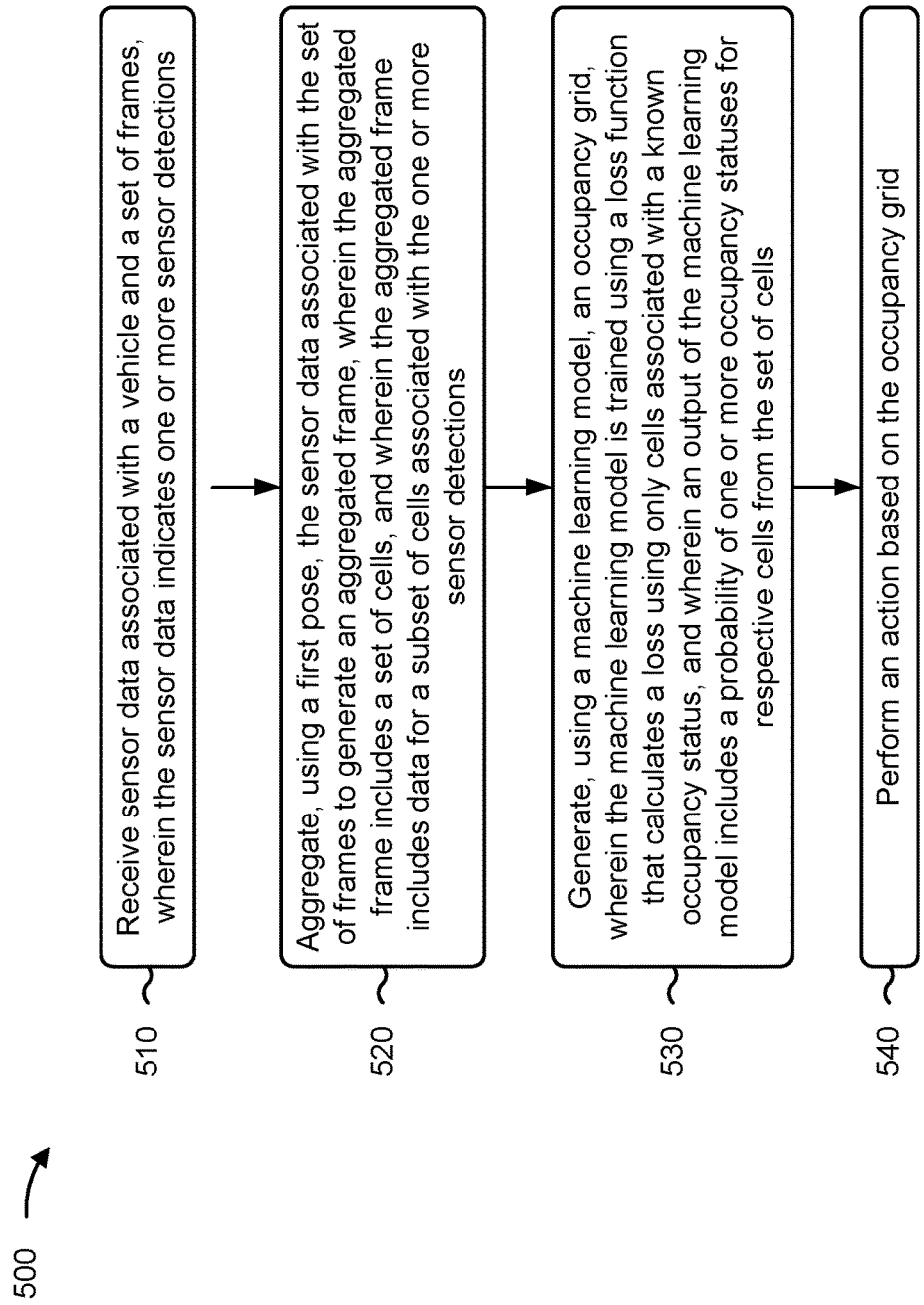
FIG. 5 is a flowchart of an example process associated with machine learning-based occupancy grid generation, in accordance with the present disclosure.

FIG. 5 is a flowchart of an example process 500 associated with machine learning-based occupancy grid generation, in accordance with the present disclosure. In some aspects, one or more process blocks of FIG. 5 are performed by a vehicle (e.g., vehicle 110 and/or ECU 112). In some aspects, one or more process blocks of FIG. 5 are performed by another device or a group of devices separate from or including the vehicle, such as the ECU 112, the server device 130, and/or the wireless communication device 120. Additionally, or alternatively, one or more process blocks of FIG. 5 may be performed by one or more components of device 200, such as processor 210, memory 215, storage component 220, input component 225, output component 230, communication interface 235, one or more sensors 240, the radar scanner 245, and/or the LIDAR scanner 250.

As shown in FIG. 5, process 500 may include receiving sensor data associated with a vehicle and a set of frames, wherein the sensor data indicates one or more sensor detections (block 510). For example, the vehicle may receive sensor data associated with a vehicle and a set of frames, wherein the sensor data indicates one or more sensor detections, as described above. In some aspects, the sensor data indicates one or more sensor detections.

As further shown in FIG. 5, process 500 may include aggregating, using a first pose, the sensor data associated with the set of frames to generate an aggregated frame, wherein the aggregated frame includes a set of cells, and wherein the aggregated frame includes data for a subset of cells associated with the one or more sensor detections (block 520). For example, the vehicle may aggregate, using a first pose, the sensor data associated with the set of frames to generate an aggregated frame, wherein the aggregated frame includes a set of cells, and wherein the aggregated frame includes data for a subset of cells associated with the one or more sensor detections, as described above. In some aspects, the aggregated frame includes a set of cells. In some aspects, the aggregated frame includes data for a subset of cells associated with the one or more sensor detections.

As further shown in FIG. 5, process 500 may include generating, using a machine learning model, an occupancy grid, wherein the machine learning model is trained using a loss function that calculates a loss using only cells associated with a known occupancy status, and wherein an output of the machine learning model includes a probability of one or more occupancy statuses for respective cells from the set of cells (block 530). For example, the vehicle may generate, using a machine learning model, an occupancy grid, wherein the machine learning model is trained using a loss function that calculates a loss using only cells associated with a known occupancy status, and wherein an output of the machine learning model includes a probability of one or more occupancy statuses for respective cells from the set of cells, as described above. In some aspects, the machine learning model is trained using a loss function that calculates a loss using only cells associated with a known occupancy status. In some aspects, an output of the machine learning model includes a probability of one or more occupancy statuses for respective cells from the set of cells.

As further shown in FIG. 5, process 500 may include performing an action based on the occupancy grid (block 540). For example, the vehicle may perform an action based on the occupancy grid, as described above.

Process 500 may include additional aspects, such as any single aspect or any combination of aspects described below and/or in connection with one or more other processes described elsewhere herein.

In a first aspect, process 500 includes obtaining, from another device, the machine learning model.

In a second aspect, alone or in combination with the first aspect, the device is a control unit of the vehicle.

In a third aspect, alone or in combination with one or more of the first and second aspects, process 500 includes converting the aggregated frame from the first pose to a second pose, wherein the first pose is a common coordinate reference frame for the set of frames, and wherein the second pose is a different coordinate reference frame.

In a fourth aspect, alone or in combination with one or more of the first through third aspects, generating the occupancy grid comprises generating the occupancy grid using the aggregated frame in the second pose as an input to the machine learning model.

In a fifth aspect, alone or in combination with one or more of the first through fourth aspects, the one or more occupancy statuses include a drivable occupancy status or an undrivable occupancy status.

In a sixth aspect, alone or in combination with one or more of the first through fifth aspects, the data for the subset of cells includes at least one of one or more radar cross section values, one or more object velocity values, a coordinate position of at least one sensory detection, a quantity of sensor detections, or an ego velocity value.

Although FIG. 5 shows example blocks of process 500, in some aspects, process 500 includes additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method, comprising: receiving, by a device, sensor data associated with a vehicle and a set of frames, wherein the sensor data indicates one or more sensor detections; aggregating, using a first pose, the sensor data associated with the set of frames to generate an aggregated frame, wherein the aggregated frame is associated with a set of cells; obtaining, by the device, an indication of a respective occupancy label for each cell from the set of cells, wherein the respective occupancy label includes a first occupancy label indicating a known occupancy status or a second occupancy label indicating an unknown occupancy status, and wherein a subset of cells from the set of cells are associated with the first occupancy label; training, using data associated with the aggregated frame, a machine learning model to generate an occupancy grid, wherein training the machine learning model is associated with a loss function that calculates a loss for respective cells from the subset of cells, and wherein the machine learning model is trained to predict a probability of an occupancy status for respective cells from the set of cells; and providing, by the device and to another device, the machine learning model.

Aspect 2: The method of Aspect 1, wherein training the machine learning model comprises: calculating, using the loss function, the loss for the respective cells from the subset of cells; refraining from calculating a loss for respective cells associated with the second occupancy label; and updating, based on the loss for the respective cells from the subset of cells, one or more weights associated with the machine learning model.

Aspect 3: The method of any of Aspects 1-2, wherein the first occupancy label is associated with indicating the occupancy status of the subset of cells, and wherein the occupancy status includes a drivable occupancy status or an undrivable occupancy status.

Aspect 4: The method of Aspect 3, wherein training the machine learning model comprises: identifying, from an output of the machine learning model, one or more cells, from the set of cells, that are associated with an incorrect occupancy status from the drivable occupancy status or the undrivable occupancy status; applying, for the loss function, a penalty weight for the one or more cells; and updating, based on an output of the loss function, one or more weights associated with the machine learning model.

Aspect 5: The method of any of Aspects 3-4, wherein the loss function includes a first loss function associated with the drivable occupancy status and a second loss function associated with the undrivable occupancy status.

Aspect 6: The method of any of Aspects 1-5, further comprising: converting the aggregated frame from the first pose to a second pose, wherein the first pose is a common coordinate reference frame for the set of frames, and wherein the second pose is a coordinate reference frame of a current position of the vehicle.

Aspect 7: The method of any of Aspects 1-6, wherein training the machine learning model comprises training the machine learning model using the aggregated frame in the second pose as an input.

Aspect 8: The method of any of Aspects 1-7, wherein the data associated with the aggregated frame includes detection data for each cell included in the subset of cells, and wherein the detection data includes at least one of: one or more radar cross section values, one or more object velocity values, a coordinate position of at least one sensor detection, a quantity of sensor detections, or an ego velocity value.

Aspect 9: The method of any of Aspects 1-8, wherein the occupancy grid includes at least one of a static occupancy grid or a dynamic occupancy grid.

Aspect 10: The method of any of Aspects 1-9, wherein the sensor data includes at least one of radar data, LIDAR data, or camera data.

Aspect 11: A method, comprising: receiving, by a device, sensor data associated with a vehicle and a set of frames, wherein the sensor data indicates one or more sensor detections; aggregating, using a first pose, the sensor data associated with the set of frames to generate an aggregated frame, wherein the aggregated frame includes a set of cells, and wherein the aggregated frame includes data for a subset of cells associated with the one or more sensor detections; generating, using a machine learning model, an occupancy grid, wherein the machine learning model is trained using a loss function that calculates a loss using only cells associated with a known occupancy status, and wherein an output of the machine learning model includes a probability of one or more occupancy statuses for respective cells from the set of cells; and performing, by the device, an action based on the occupancy grid.

Aspect 12: The method of Aspect 11, comprising: obtaining, from another device, the machine learning model.

Aspect 13: The method of any of Aspects 11-12, wherein the device is a control unit of the vehicle.

Aspect 14: The method of any of Aspects 11-13, further comprising: converting the aggregated frame from the first pose to a second pose, wherein the first pose is a common coordinate reference frame for the set of frames, and wherein the second pose is a different coordinate reference frame.

Aspect 15: The method of Aspect 14, wherein generating the occupancy grid comprises: generating the occupancy grid using the aggregated frame in the second pose as an input to the machine learning model.

Aspect 16: The method of any of Aspects 11-15, wherein the one or more occupancy statuses include a drivable occupancy status or an undrivable occupancy status.

Aspect 17: The method of any of Aspects 11-16, wherein the data for the subset of cells includes at least one of: one or more radar cross section values, one or more object velocity values, a coordinate position of at least one sensory detection, a quantity of sensor detections, or an ego velocity value.

Aspect 18: The method of any of Aspects 11-17, wherein the occupancy grid includes at least one of a static occupancy grid or a dynamic occupancy grid.

Aspect 19: The method of any of Aspects 11-18, wherein the sensor data includes at least one of radar data, LIDAR data, or camera data.

Aspect 20: A system configured to perform one or more operations recited in one or more of Aspects 1-10.

Aspect 21: An apparatus comprising means for performing one or more operations recited in one or more of Aspects 1-10.

Aspect 22: A non-transitory computer-readable medium storing a set of instructions, the set of instructions comprising one or more instructions that, when executed by a device, cause the device to perform one or more operations recited in one or more of Aspects 1-10.

Aspect 23: A computer program product comprising instructions or code for executing one or more operations recited in one or more of Aspects 1-10.

Aspect 24: A system configured to perform one or more operations recited in one or more of Aspects 11-19.

Aspect 25: An apparatus comprising means for performing one or more operations recited in one or more of Aspects 11-19.

Aspect 26: A non-transitory computer-readable medium storing a set of instructions, the set of instructions comprising one or more instructions that, when executed by a device, cause the device to perform one or more operations recited in one or more of Aspects 11-19.

Aspect 27: A computer program product comprising instructions or code for executing one or more operations recited in one or more of Aspects 11-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, coupled to the one or more memories, configured to:
receive a set of frames of point data corresponding to sensor data associated with a vehicle, wherein the sensor data indicates one or more sensor detections;
aggregate one or more frames of the set of frames associated with a first pose into an aggregated frame, wherein the aggregated frame is associated with a set of cells;
obtain an indication of a respective occupancy label for each cell from the set of cells,
wherein the respective occupancy label includes a first occupancy label indicating a known occupancy status or a second occupancy label indicating an unknown occupancy status, and
wherein a subset of cells from the set of cells are associated with the first occupancy label;
convert the aggregated frame from the first pose to a second pose to generate an another aggregated frame;
train, using data associated with the another aggregated frame, a machine learning model to generate an occupancy grid,
wherein training the machine learning model is associated with a loss function that calculates a loss for respective cells from the subset of cells, and
wherein the machine learning model is trained to predict a probability of an occupancy status for respective cells from the set of cells; and
provide, to another device, the machine learning model.

2. The device of claim 1, wherein the one or more processors, to train the machine learning model, are configured to:
calculate, using the loss function, the loss for the respective cells from the subset of cells;
refrain from calculating a loss for respective cells associated with the second occupancy label; and
update, based on the loss for the respective cells from the subset of cells, one or more weights associated with the machine learning model.

3. The device of claim 1, wherein the first occupancy label is associated with indicating the occupancy status of the subset of cells, and
wherein the occupancy status includes a drivable occupancy status or an undrivable occupancy status.

4. The device of claim 3, wherein the one or more processors, to train the machine learning model, are configured to:
identify, from an output of the machine learning model, one or more cells, from the set of cells, that are associated with an incorrect occupancy status from the drivable occupancy status or the undrivable occupancy status;
apply, for the loss function, a penalty weight for the one or more cells; and
update, based on an output of the loss function, one or more weights associated with the machine learning model.

5. The device of claim 3, wherein the loss function includes a first loss function associated with the drivable occupancy status and a second loss function associated with the undrivable occupancy status.

6. The device of claim 1,
wherein the first pose is a common coordinate reference frame for the set of frames, and
wherein the second pose is a coordinate reference frame of a current position of the vehicle.

7. The device of claim 1, wherein the data associated with the aggregated frame includes detection data for each cell included in the subset of cells, and wherein the detection data includes at least one of:
one or more radar cross section values,
one or more object velocity values,
a coordinate position of at least one sensor detection,
a quantity of sensor detections, or
an ego velocity value.

8. A device, comprising:
one or more memories; and
one or more processors, coupled to the one or more memories, configured to:
receive a set of frames of point data corresponding to sensor data associated with a vehicle,
wherein the sensor data indicates one or more sensor detections;
aggregate one or more frames of the set of frames associated with a first pose to generate an aggregated frame,
wherein the aggregated frame includes a set of cells, and
wherein the aggregated frame includes data for a subset of cells associated with the one or more sensor detections;
convert the aggregated frame from the first pose to a second pose to generate an another aggregated frame;
generate an occupancy grid using the another aggregated frame as an input to a machine learning model,
wherein the machine learning model is trained using a loss function that calculates a loss using only cells associated with a known occupancy status, and
wherein an output of the machine learning model includes a probability of one or more occupancy statuses for respective cells from the set of cells; and
perform an action associated with controlling the vehicle based on the occupancy grid.

9. The device of claim 8,
wherein the first pose is a common coordinate reference frame for the set of frames, and
wherein the second pose is a different coordinate reference frame.

10. The device of claim 8, wherein the one or more occupancy statuses include a drivable occupancy status or an undrivable occupancy status.

11. The device of claim 8, wherein the data for the subset of cells includes at least one of:
one or more radar cross section values,
one or more object velocity values,
a coordinate position of at least one sensor detection,
a quantity of sensor detections, or
an ego velocity value.

12. The device of claim 8, wherein the occupancy grid includes at least one of a static occupancy grid or a dynamic occupancy grid.

13. The device of claim 8, wherein the sensor data includes at least one of radar data, LIDAR data, or camera data.

14. A method, comprising:
receiving, by a device, a set of frames of point data corresponding to sensor data associated with a vehicle,
wherein the sensor data indicates one or more sensor detections;

aggregating one or more frames of the set of frames associated with a first pose to generate an aggregated frame,
  wherein the aggregated frame is associated with a set of cells;
obtaining, by the device, an indication of a respective occupancy label for each cell from the set of cells,
  wherein the respective occupancy label includes a first occupancy label indicating a known occupancy status or a second occupancy label indicating an unknown occupancy status, and
  wherein a subset of cells from the set of cells are associated with the first occupancy label;
converting the aggregated frame from the first pose to a second pose to generate an another aggregated frame;
training, using data associated with the another aggregated frame, a machine learning model to generate an occupancy grid,
  wherein training the machine learning model is associated with a loss function that calculates a loss for respective cells from the subset of cells, and
  wherein the machine learning model is trained to predict a probability of an occupancy status for respective cells from the set of cells; and
providing, by the device and to another device, the machine learning model.

15. The method of claim 14, wherein training the machine learning model comprises:
calculating, using the loss function, the loss for the respective cells from the subset of cells;
refraining from calculating a loss for respective cells associated with the second occupancy label; and
updating, based on the loss for the respective cells from the subset of cells, one or more weights associated with the machine learning model.

16. The method of claim 14, wherein the first occupancy label is associated with indicating the occupancy status of the subset of cells, and
wherein the occupancy status includes a drivable occupancy status or an undrivable occupancy status.

17. The method of claim 16, wherein training the machine learning model comprises:
identifying, from an output of the machine learning model, one or more cells, from the set of cells, that are associated with an incorrect occupancy status from the drivable occupancy status or the undrivable occupancy status;
applying, for the loss function, a penalty weight for the one or more cells; and
updating, based on an output of the loss function, one or more weights associated with the machine learning model.

18. The method of claim 16, wherein the loss function includes a first loss function associated with the drivable occupancy status and a second loss function associated with the undrivable occupancy status.

19. The method of claim 14,
wherein the first pose is a common coordinate reference frame for the set of frames, and
wherein the second pose is a coordinate reference frame of a current position of the vehicle.

20. The method of claim 14, wherein the occupancy grid includes at least one of a static occupancy grid or a dynamic occupancy grid.

21. The method of claim 14, wherein the sensor data includes at least one of radar data, LIDAR data, or camera data.

22. A method, comprising:
receiving, by a device, a set of frames of point data corresponding to sensor data associated with a vehicle,
  wherein the sensor data indicates one or more sensor detections;
aggregating one or more frames of the set of frames associated with a first pose to generate an aggregated frame,
  wherein the aggregated frame includes a set of cells, and
  wherein the aggregated frame includes data for a subset of cells associated with the one or more sensor detections;
converting the aggregated frame from the first pose to a second pose to generate an another aggregated frame;
generating, using a machine learning model, an occupancy grid using the another aggregated frame as an input to a machine learning model,
  wherein the machine learning model is trained using a loss function that calculates a loss using only cells associated with a known occupancy status, and
  wherein an output of the machine learning model includes a probability of one or more occupancy statuses for respective cells from the set of cells; and
performing, by the device, an action associated with controlling the vehicle based on the occupancy grid.

23. The method of claim 22, comprising:
obtaining, from another device, the machine learning model.

24. The method of claim 22, wherein the device is a control unit of the vehicle.

25. The method of claim 22,
wherein the first pose is a common coordinate reference frame for the set of frames, and
wherein the second pose is a different coordinate reference frame.

26. The method of claim 22, wherein the one or more occupancy statuses include a drivable occupancy status or an undrivable occupancy status.

27. The method of claim 22, wherein the data for the subset of cells includes at least one of:
one or more radar cross section values,
one or more object velocity values,
a coordinate position of at least one sensory detection,
a quantity of sensor detections, or
an ego velocity value.

28. The method of claim 22, wherein the occupancy grid includes at least one of a static occupancy grid or a dynamic occupancy grid.

29. The method of claim 22, wherein the sensor data includes at least one of radar data, LIDAR data, or camera data.

30. The device of claim 1, wherein the sensor data includes at least one of radar data, LIDAR data, or camera data.

* * * * *